United States Patent
Liu et al.

(10) Patent No.: US 7,006,279 B2
(45) Date of Patent: Feb. 28, 2006

(54) OPTICAL HARMONIC EQUALIZATION CONTROL SYSTEMS AND METHODS

(75) Inventors: Yueai Liu, Plano, TX (US); Xiangjun Zhao, Dallas, TX (US); Xinjie Huang, Plano, TX (US); Tizhi Huang, Plano, TX (US)

(73) Assignee: EC-Optics Technology Inc., (WS)

( * ) Notice: Subject to any disclaimer, the term of this patent is extended or adjusted under 35 U.S.C. 154(b) by 883 days.

(21) Appl. No.: 10/076,989

(22) Filed: Feb. 15, 2002

(65) Prior Publication Data

US 2003/0020989 A1   Jan. 30, 2003

Related U.S. Application Data

(60) Provisional application No. 60/269,521, filed on Feb. 16, 2001, provisional application No. 60/269,753, filed on Feb. 16, 2001, provisional application No. 60/276,817, filed on Mar. 16, 2001.

(51) Int. Cl.
*H01S 3/00*   (2006.01)
*G02B 27/28*   (2006.01)

(52) U.S. Cl. .................... 359/337.1; 359/498
(58) Field of Classification Search ............... 359/337, 359/337.1, 498; 398/158
See application file for complete search history.

(56) References Cited

U.S. PATENT DOCUMENTS

| | | |
|---|---|---|
| 5,016,242 A | 5/1991 | Tang |
| 5,111,321 A | 5/1992 | Patel |
| 5,119,443 A | 6/1992 | Javidi et al. |
| 5,243,455 A | 9/1993 | Johnson et al. |
| 5,381,253 A | 1/1995 | Sharp et al. |
| 5,436,760 A | 7/1995 | Nakabayashi |
| 5,592,327 A | 1/1997 | Gabl et al. |
| 5,596,661 A | 1/1997 | Henry et al. |
| 5,600,467 A | 2/1997 | Fee |
| 5,657,143 A | 8/1997 | Hajj et al. |
| 5,889,900 A | 3/1999 | Hallemeier |
| 5,963,291 A | 10/1999 | Wu et al. |
| 5,963,364 A | 10/1999 | Leong et al. |
| 5,978,116 A | 11/1999 | Wu et al. |
| 5,978,529 A | 11/1999 | Taga et al. |
| 6,034,812 A | 3/2000 | Naito |
| 6,081,360 A | 6/2000 | Ishikawa et al. |
| 6,130,731 A | 10/2000 | Andersson et al. |
| 6,275,328 B1 | 8/2001 | Parry et al. |
| 6,321,000 B1 | 11/2001 | King |
| 6,339,492 B1 * | 1/2002 | Terahara et al. ............ 359/283 |

(Continued)

OTHER PUBLICATIONS

Kim et al., Dynamic Gain Equalization of Erbium-Doped Fiber Amplifier with All-Fiber Acousto-Optic Tunable Filters, OFC '98 Technical Digest, pp. 136-138.

(Continued)

*Primary Examiner*—Mark Hellner
(74) *Attorney, Agent, or Firm*—Baker & McKenzie LLP

(57) ABSTRACT

Devices and methods for equalizing the gain of an optical amplifier are described. For devices including harmonic filters that are controllable by amplitude control voltages and phase control voltages, techniques for controlling the amplitude control voltages and phase control voltages are presented. Additionally, device architectures are described by which an incoming optical signal is equalized to compensate for uneven gain in prior amplifiers or other optical components, and in which the incoming optical signal is received at a beam displacer and separated into orthogonal component beams, wherein the beams are counter-propagated through the equalizer in opposite directions through the same spatial path so as to minimize or eliminate the effects spatially dependent imperfections in the equalizer.

38 Claims, 11 Drawing Sheets

U.S. PATENT DOCUMENTS

| | | | |
|---|---|---|---|
| 6,347,006 B1 * | 2/2002 | Parry et al. | 359/337.11 |
| 6,411,417 B1 * | 6/2002 | Roberts et al. | 398/177 |
| 6,429,962 B1 * | 8/2002 | Xu et al. | 359/337.1 |
| 6,717,730 B1 * | 4/2004 | Terahara et al. | 359/494 |
| 6,807,376 B1 * | 10/2004 | Shimojoh et al. | 398/149 |

OTHER PUBLICATIONS

Parry et al., Dynamic Gain Equalisation of EDFAs with Fourier Filters, Nortel Networks.

Betts et al., Split-Beam Fourier Filter and its Application in a Gain-Flattened EDFA, OFC '95 Technical Digest, pp. 80-81.

Frisken et al., Low-Loss Polarisation-Independent Dynamic Gain-Equalisation Filter, Optical Fiber Communication Conference 2000, pp. 251-253, vol. 2 (Mar. 2000).

The Photonics Dictionary, Definition of Twisted Nematic Phase.

Wu, Shin-Tson, Liquid Crystals, Chapter 14, pp. 14.1-14.26.

Inoue et al., Tunable Gain Equalization Using a Mach-Zehnder Optical Filter in Multstage Fiber Amplifiers, IEEE Photonics Technology Letters, vol. 3, No. 8 (Aug. 1991).

* cited by examiner

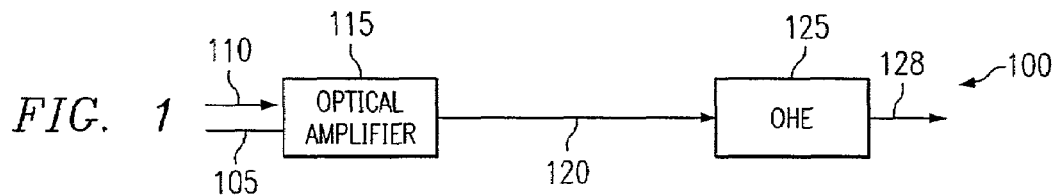
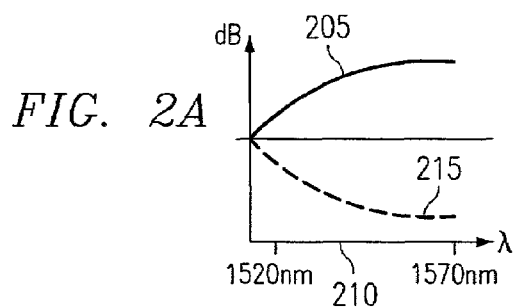
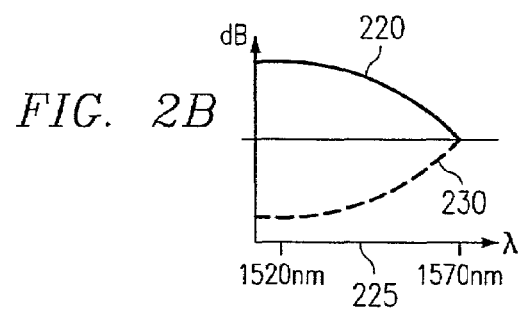
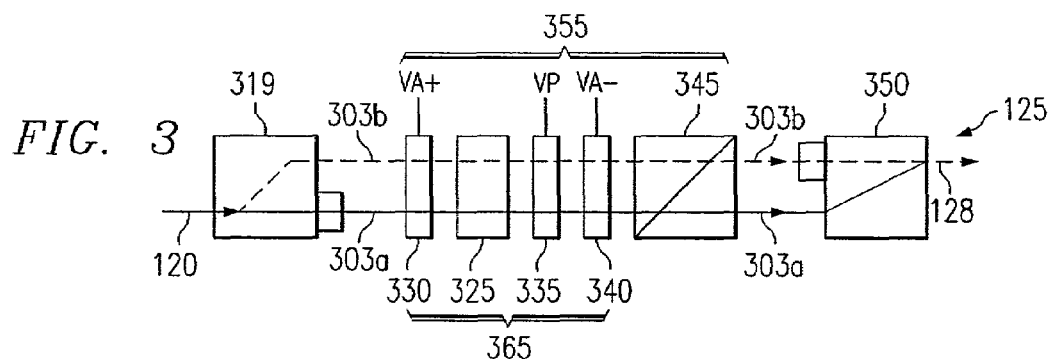
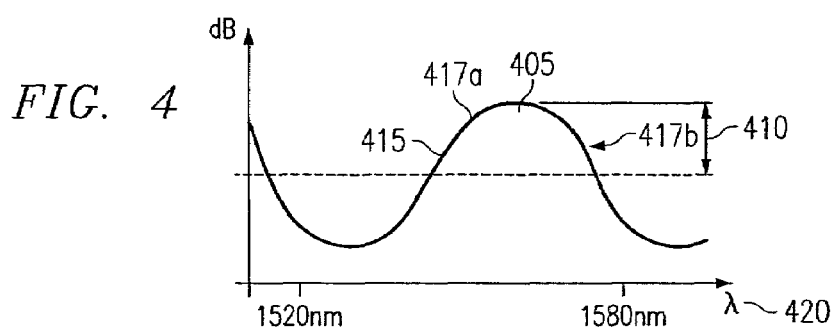

OPTICAL HARMONIC EQUALIZATION CONTROL SYSTEMS AND METHODS

RELATED PATENT APPLICATIONS

This application depends and claims priority from U.S. Provisional Patent Application No. 60/269,521, filed Feb. 16, 2001, U.S. Provisional Patent Application No. 60/269,753, filed Feb. 16, 2001, and U.S. Provisional Patent Application No. 60/276,817, filed Mar. 16, 2001, which are hereby incorporated by reference herein. This application is further related to commonly owned U.S. patent application Ser. No. 10/077,617, filed concurrently herewith, which is also hereby incorporated by reference herein.

TECHNICAL FIELD

The present application relates to optical communications, and, more particularly, to devices and methods for achieving optical equalization.

BACKGROUND

As telecommunications bandwidth requirements continue to rise, electrical wires as a communication medium are pushed to their capacity. The limitations of electrical wires has resulted in a growing trend towards the use of optical fibers to facilitate voice and data communications.

Communication signals traversing a communication channel lose strength as the distance traveled increases. To increase the distance that the signal travels, the signal is regenerated at certain points along the communication channel. Electrical signals are often regenerated using repeaters. In contrast, optical signals are regenerated using optical amplifiers.

A common optical amplifier is known as an Erbium Doped Fiber Amplifier (EDFA). An EDFA comprises a section of fiber, which is doped with erbium. A high-powered beam of light is mixed with the input signal using a wavelength selective coupler. The mixed light is guided into the erbium-doped section of fiber. The high powered light beam excites the erbium ions to a higher state. The photons of the signal light receive energy from the erbium ions when the erbium ions return to a lower state, thereby amplifying the signal.

The gain of the output signal from an optical amplifier often varies with signal wavelength. For example, an optical amplifier such as a Raman amplifier may produce a higher gain in lower wavelengths and a lower gain in higher wavelengths. In theory, other another type of amplifier might produce a higher gain in higher wavelengths and lower gain in lower wavelengths. The gain produced by such amplifiers is known as "titled gain." In other cases, the optical amplifier may produce a gain that varies more complexly with respect to the wavelength.

SUMMARY

Disclosed herein are equalization methods and devices which can process an incoming optical signal or optical beam to compensate for wavelength-dependent variations in the gain or transfer function of amplifiers or other optical elements which come prior to the equalization devices in an optical signal path. The equalizer processes the incoming signal by imparting wavelength-dependent filtering or gain upon the incoming optical signal, thus compensating for the generally undesirable wavelength-dependent transmission functions of other components in the optical signal path.

In many instances, the target or desired power spectrum at the output of the optical equalizer will be flat. In other cases, it may be desirable to have a gain profile which is slanted linearly, either increasing or decreasing, with wavelength, and in still other cases a more complex gain profile may be desired.

In one technique, a control algorithm compares the power spectrum from the equalizer and compares that actual power spectrum to the target power spectrum. The actual spectrum can be subtracted from the target spectrum, to yield a difference or "delta" power spectrum, which will represent the change that is needed to be made to the equalizer in order to achieve the target power spectrum at the equalizer output. In an equalizer having multiple stages, the delta power spectrum can be broken down into component values corresponding to harmonic components of the delta power spectrum, and these component values can in turn be applied to individual filter stages within a multiple-stage equalizer so the equalizer can more nearly achieve the target power spectrum.

In another technique, a target transfer function is determined based on the spectral energy of the amplified signal. The actual transfer function of the equalizer is then measured, and the measured transfer function and the target equalization function are compared. A difference between the measured target equalization function and the actual transfer function can be calculated as described above, and based on the calculated difference between the measured target equalization function and the actual transfer function. This difference between the target transfer function and the actual transfer function of the equalizer should yield approximately the same delta power spectrum as was calculated using the previous technique. Again, the delta power spectrum can then be broken down into component values corresponding to harmonic components of the delta power spectrum, and these component values can also be applied to the multiple filter stages of a multiple-stage equalizer.

In another technique, based on the harmonic component values of the delta power spectrum, a series of phase constants and amplitude constants are calculated. Based on these calculated phase constants and amplitude constants, the control voltages applied to at least one of a plurality of harmonic filters are adjusted. These adjustments could be made according to a calculation which has been defined in the control algorithm, or a look-up table could be provided in memory correlating certain phase constants and amplitude constants to control voltages to the filter stages.

Additionally presented herein are architectures, that improve performance of optical devices in achieving equalization. One architecture includes a beam displacer or separating element and a component assembly. The incoming amplified signal is received by the beam displacer and split into two beams. The two beams are counter-propagated through the component assembly in opposite directions, but through substantially the same spatial path. Propagation along the same spatial path reduces the effect of spatially varying optical properties within optical components and improves the performance of the equalizers and the quality of the equalized signal.

Another architecture includes a beam displacer or separating element and a component assembly. The incoming amplified signal is received by the beam displacer and split into two beams. The two beams are counter-propagated through the component assembly in opposite directions, but through substantially the same spatial path. The beams are then received by a redirecting element, which redirects the two beams to a beam displacer. The beam displacer, acting in this context as a beam combiner, combines the beams, resulting in an output signal which may be equalized, or have a substantially flat power spectrum, or may have a more complexly varying power spectrum allowing it to pre-compensate for other elements coming later in the optical signal path.

The first and second beams can be combined at substantially the same location as where the optical signal was separated into the first and second beams, whereby the beams follow substantially the same path from beginning to end, and whereby the effects of spatially dependent imperfections in the component assembly are substantially minimized.

The processing of the first and second beams may comprise equalizing the optical signal to generate an output from the component assembly which approximates a target power spectrum, the component assembly thereby comprising an equalizer which compensates for wavelength-dependent transfer function variations in components prior to the component assembly in the optical signal path, wherein the component assembly comprises a plurality of filters and wherein each of those filters is associated with an element in a frequency-domain series approximation of a target transfer function, which for a given input signal will achieve a target output optical power spectrum. The parameters of those filters can then be adjusted in order to improve the frequency-domain series, such as a Fourier series, approximation of the target transfer function. The adjusted parameters might be the amplitude or phase coefficients. Further provided in an exemplary embodiment is a controller operable to monitor the optical spectrum output from the equalizer and to adjust parameters of at least one filter in order to control the filters so that the optical spectrum output from the equalizer approximates a target power spectrum.

Control methods are also described above for controlling an optical harmonic equalizer comprising a plurality of harmonic filters, the equalizer having an optical signal input for receiving an input optical signal and an optical signal output for transmitting an output optical signal. Certain of these methods comprise determining a target power spectrum for the output optical signal, measuring the power spectrum of the output optical signal, calculating the difference between the measured power spectrum and the target power spectrum, and adjusting at least one amplitude control voltage and at least one phase control voltage associated with at least one of the plurality of harmonic filters based on the difference between the measured power spectrum and the target power spectrum.

The difference between the measured power spectrum and the target power spectrum can be decomposed into a frequency-domain series approximation wherein the frequency-domain series approximation is a Fourier approximation. In the approximation, each element in the frequency-domain series approximation is represented by a frequency-domain variable and at least one constant, and wherein each element in the approximation is associated with one of the plurality of harmonic filters. One approach for determining the constants associated with each element in the frequency-domain series approximation is to compute these constants in steps, beginning with the lowest-order series element and ending with the highest-order series element.

At each step prior to the last step when the frequency-domain constants are calculated in steps, beginning with the lowest-order element, a residual function is calculated at each step wherein the residual function is the remainder after subtracting the current frequency-domain series approximation from the target power spectrum, wherein the current frequency-domain series approximation includes the computed frequency-domain approximation elements which are known at that step.

The measuring, calculating, and adjusting actions can be repeated a plurality of times until the actual power spectrum reaches sufficiently close to the target power spectrum. The success in this approximation can be assessed by comparing the magnitude of the calculated difference to a predetermined threshold and repeating the measuring, calculating, and adjusting actions until the magnitude of the calculated difference is less than the predetermined threshold.

Another method for controlling an equalizer having at least one harmonic filter comprises determining a target transfer function for the equalizer, measuring an actual transfer function for the equalizer, calculating at least one amplitude constant and at least one phase constant for each of the at least one harmonic filters, the amplitude and phase constants being calculated to adjust the actual transfer function of the equalizer to more closely approximate the target transfer function, and adjusting at least one amplitude control voltage and at least one phase control voltage to the at least one harmonic filter, wherein each of the at least one amplitude control voltages is dependent on a particular one of the at least one amplitude constants, and wherein each of the at least one phase control voltages is dependent on a particular one of the at least one phase constants.

This method may include determining the target transfer function by measuring spectral energy of an input signal and subtracting the spectral energy of the input signal from a target power spectrum. At least one amplitude constant and the at least one phase constant can be computed by decomposing the target transfer function into at least one Fourier component, wherein each of the at least one Fourier components is associated with a particular one of the at least one harmonic filters, and decomposing the actual transfer function into at least one Fourier component, wherein each of the at least one Fourier components is associated with a particular one of the at least one harmonic filters, and comparing the at least one Fourier component of the actual transfer function to the at least one Fourier components of the target transfer function, whereby using frequency-domain calculations it can be determined whether the actual transfer function has sufficiently approximated the target transfer function. This process can be repeated for a certain number of iterations or until the target power spectrum or target transfer function is reached.

A controller can be provided to achieve these functions. This controller may include a processor for executing a plurality of executable instructions and a memory operable to store the plurality of executable instructions. The executable instructions further comprise instructions which are operable to determine a target transfer function for the equalizer, calculate at least one amplitude constant and at least one phase constant for each of the at least one harmonic filters, the amplitude constant and phase constant being calculated to adjust the actual transfer function of the equalizer to more closely approximate the target transfer function, and adjust at least one amplitude control voltage and at least one phase control voltage to the at least one harmonic filters, wherein each of the at least one amplitude control voltages is dependent on a particular one of the at least one amplitude constants, and wherein each of the at least one phase control voltages is dependent on a particular one of the at least one phase constants.

The executable instructions may further comprise executable instructions which are operable to measure the spectral energy of an input signal and subtract the spectral energy of the input signal from a target power spectrum to determine the target transfer function of the equalizer. The controller may communicate with an optical spectrum analyzer to measure the actual transfer function of the equalizer, and this actual transfer function may be effectively measured by the optical spectrum analyzer by measuring the power spectrum of an output optical signal and subtracting the spectral energy of the input signal.

Also described is a method for controlling a plurality of harmonic filters, the method comprising determining a target transfer function, calculating a first sinusoidal function with a first amplitude constant and a first phase constant, wherein the first sinusoidal function approximates the target transfer function, calculating a residual equalization profile by subtracting the first sinusoidal function from the target transfer function, and calculating a second sinusoidal function with a second amplitude constant and a second phase constant, wherein the second sinusoidal function approximates the residual equalization profile whereby the first and second sinusoidal functions added together more closely approximate the target transfer function than did the first sinusoidal function.

In this method, the determining the target transfer function may further comprise determining spectral energy associated with an input signal and subtracting the spectral energy from a target power spectrum. The calculating of the first sinusoidal function may further comprise calculating a sinusoid with a predetermined wavelength with the lowest least square error with respect to the target transfer function. Other actions that may be a part of the method include adjusting a phase control voltage based on the first phase constant and adjusting an amplitude control voltage based on the first amplitude constant.

The phase control voltage may be applied to a first harmonic filter and the amplitude control voltage may also be applied to the first harmonic filter, wherein the first harmonic filter applies the first sinusoidal function to the input signal to generate an output optical signal. A second phase control voltage and a second amplitude control voltage may also be applied to a second harmonic filter which will apply the second sinusoidal function to the input signal to generate an output optical signal with the first harmonic filter.

A controller for controlling a plurality of harmonic filters is also described, wherein the controller comprises a processor which is operable to execute a plurality of executable instructions and a memory in communication with the processor, the memory comprising the plurality of executable instructions wherein the plurality of executable instructions comprises instructions. The executable instructions in this case may include instructions which determine a target transfer function, calculate a first sinusoidal function with a first amplitude constant and a first phase constant, wherein the first sinusoidal function approximates the equalization profile, calculate a residual equalization function, and calculate a second sinusoidal function with a second amplitude constant and a second phase constant, wherein the second sinusoidal function approximates the residual equalization function. Further, the instructions which calculate the first sinusoidal function further comprise instructions which calculate a sinusoid with a predetermined wavelength with the lowest least square error with respect to the target transfer function. The instructions further may calculate the residual function by subtracting the first sinusoidal function from the target transfer function.

Also provided with the controller described above may be a plurality of executable instructions further comprise instructions which are operable to adjust a phase control voltage based on the first phase constant and adjust an amplitude control voltage based on the first amplitude constant.

In the above approach, the phase control voltage may be applied to a first harmonic filter and the amplitude control voltage may also be applied to the first harmonic filter. The first harmonic filter then applies the first sinusoidal function to the input signal to generate an output optical signal.

The controller may also be operable with its executable instructions to calculate a second phase control voltage and a second amplitude control voltage to be applied to a second harmonic filter, which will apply the second sinusoidal function to the input signal to generate an output optical signal with the first harmonic filter.

Further described is an optical system which is operable to receive an optical input signal, the optical system comprising an optical signal input, an optical signal output, a plurality of harmonic filter stages driven by a plurality of control voltages, and an optical path optically connecting the optical signal output to the optical signal input through the plurality of harmonic filter stages. The plurality of harmonic filter stages are operable to selectively attenuate by wavelength the optical signal carried on the optical path to thereby generate an equalized optical signal at the optical signal output. Also provided is an optical spectrum analyzer connected to the optical signal output and operable to receive the equalized optical signal and to measure the optical power spectrum of the equalized optical signal. A controller is further in communication with and operable to control the plurality of harmonic filter stages, the controller further in communication with the optical spectrum analyzer whereby the controller is operable to receive data representing a measurement of the optical power spectrum of the equalized optical signal and to compare that measured optical power spectrum to a target power spectrum. Based on the comparison, the controller adjusts the plurality of harmonic filter stages such that the attenuation imposed by the plurality of harmonic filters is adjusted to cause the power spectrum of the equalized optical signal to more closely approximate the target power spectrum.

The system may further comprise a memory connected to the controller, wherein the adjustments to the control voltages are made according to values stored in the memory which correlate certain elements of the Fourier series approximation to certain control voltages. The controller may be a digital signal processor. The system also can include a graphical user interface wherein an automatic control configuration section is provided for configuring a control algorithm for the plurality of harmonic filter stages. The automatic control configuration section further includes an output spectrum control section for configuring the controller to control the plurality of harmonic filter stages to output. The output signal thereafter is adjusted to approximate the target power spectrum.

To control the system, a controller is provided in communication with and operable to control the plurality of harmonic filter stages, the controller further communicates with the optical spectrum analyzer whereby the controller is operable to receive data representing a measurement of the optical power spectrum of the equalized optical signal and compares that measured optical power spectrum to a target power spectrum and adjusts the multiple stages of the equalizer such that the attenuation of the plurality of harmonic filters is adjusted to cause the power spectrum of the equalized optical signal to more closely approximate the target power spectrum.

In this system, the controller may further measure the optical spectrum difference between the optical power spectrum of the output optical signal and the target power spectrum and decompose those differences into a Fourier series approximation. In this system, the plurality of control voltages are applied to the plurality of harmonic filter stages to adjust them according to the Fourier series approximation of the differences between the optical power spectrum of the output optical signal and the target power spectrum.

Also provided is a memory connected to the controller, wherein the adjustments to the control voltages are computed by the controller in accordance with an algorithm contained in executable instructions stored in the memory.

Further described is a Graphical User Interface ("GUI") for configuring an optical harmonic equalizer, which provides an output signal that is a wavelength compensated version of an input signal. The graphical user interface comprises an automatic control configuration section for configuring a control algorithm for the optical harmonic equalizer, the automatic control configuration section comprising a power spectrum control section for configuring the equalizer to form at its output an output signal which approximates a target power spectrum.

The graphical user interface may include in an output spectrum control section at least two target inputs for configuring relative spectrum amplitudes of at least two wavelength regions within the target power spectrum. This section may include at least three target inputs for configuring relative spectrum amplitudes of at least three wavelength regions within the target power spectrum. Alternatively, this output spectrum control section may comprise a graphical input by which a user could graphically describe a target power spectrum which the user desires the equalizer to form at its output.

The GUI may also include performance indicator displays whereby a user can determine the relative success of the equalizer in approximating the target power spectrum.

The GUI may also include an input where the user can configure the equalizer to allow the input signal to pass through without equalization, thereby allowing an optical spectrum analyzer placed at the output of the equalizer to determine the power spectrum shape of the input signal so that the equalizer an be configured to compensate for gain variations with wavelength in prior optical components.

The GUI may also include a manual control section having a plurality of filter stage configuration fields whereby optical parameters can be set specifically and manually for each stage within the equalizer.

BRIEF DESCRIPTION OF THE DRAWINGS

FIG. 1 is a block diagram of an exemplary optical communication system;

FIG. 2A is a graph of a first exemplary gain function and equalizer transfer function;

FIG. 2B is a graph of a second exemplary gain function and equalizer transfer function;

FIG. 3 is a block diagram of an exemplary equalizer having a single harmonic filter;

FIG. 4 is a transfer function associated with the harmonic filter of FIG. 3;

DETAILED DESCRIPTION

Figure 5:
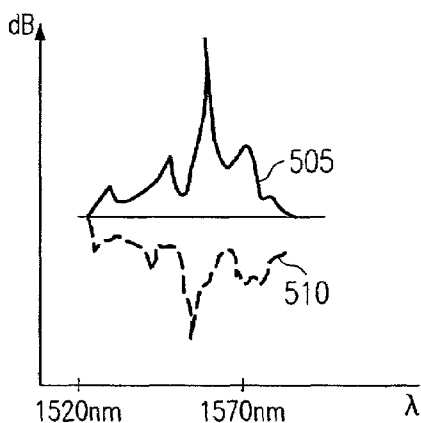
FIG. 5 is a graph of a third exemplary gain function and equalizer transfer function.

Referring now to FIG. 1, there is illustrated a block diagram of an optical network, referenced generally by the numeric designation 100. The optical network 100 includes a fiber optic link 105 carrying thereon any number of optical signals 110. Wavelength division multiplexing (WDM) and dense wavelength division multiplexing (DWDM) provision any number of wavelength channels for transmission of information. In WDM and DWDM applications, carriers of differing optical wavelengths are transmitted in parallel through the optical fiber link 105. In other words, the optical signals 110 will comprise a number of optical carriers having differing wavelengths, and the optical signals 110 will accordingly occupy a spectrum which is broader than in prior single-wavelength systems. Thus, in the WDM and DWDM applications, the wavelengths being transmitted through the optical system span a broader range. In contrast to a single optical wavelength system, where a single discrete carrier at one narrow wavelength is transmitted through the optical network, in the WDM and DWDM case wavelength-dependent transmission effects begin to take hold. The varying optical performance for different optical wavelengths accordingly begins to affect the performance of the overall fiber transmission network.

As the fiber optic link 105 carries the signals 110 for longer distances, the signals 110 attenuate, making optical detection difficult. The strength of the signals 110 is increased by an optical amplifier 115. An exemplary optical amplifier 115 can comprise, for example, an Erbium Doped Fiber Amplifier (EDFA). The optical amplifier 115 is characterized by a gain function, which often varies with respect to input wavelength. Therefore, the optical amplifier 115 outputs an amplified signal 120, wherein the wavelength channels of the WDM or DWDM signal # 120 are amplified by different factors. Specifically, the EDFA would ideally amplify the entire spectrum of the incoming signal 110 by an equal amount, but because of the physical limitations of the amplifier, its gain will vary with wavelength. This wavelength-dependent gain characteristic is accentuated because of the greater bandwidth occupied by the signal 110 carrying multiple WDM or DWDM channels.

The amplified signal 120 is received by an Optical Harmonic Equalizer ("OHE") 125. To compensate for varying gain among the different wavelength channels of amplified signal 120, the equalizer 125 processes that amplified signal 120, selectively attenuating particular wavelengths to yield at its output an equalized signal 128 having, in one example, a substantially equivalent gain among its wavelength channels relative to the incoming signal 110.

The equalization may be performed by imparting wavelength-dependent filtering or gain upon the amplified signal 120, thus compensating for the generally undesirable wavelength-dependent transmission functions of other components in the optical signal path. For convenience in the embodiments below, the equalization is generally described as being performed by wavelength-dependant filtering or attenuation of the amplified signal 120, but it should be understood that the equalization can also be performed in the equalizer 125 by selectively amplifying certain portions of the power spectrum of the amplified signal 120.

Referring now to FIG. 2A, there is illustrated a graph describing an exemplary output gain function 205 of the optical amplifier 115 with respect to wavelengths 210. For example, optical amplifier 115 amplifies wavelengths in the 1520–1570 nm wavelength range. An ideal optical amplifier 115 produces a flat gain with respect to the wavelengths. The exemplary optical amplifier 115, however, produces a higher gain in higher wavelengths and a lower gain in lower wavelengths, resulting in the exemplary output gain function 205. This is known as tilted gain. Therefore, to compensate for this tilted gain, a transfer function is applied by the equalizer 125 to the amplified signal 120, attenuating the lower wavelengths to a lower degree and the higher wavelengths to a higher degree. The preferred transfer function for the exemplary output gain function 205 is described by curve 215.

Alternatively, an optical amplifier 115 may produce lower gain in higher wavelengths. Referring now to FIG. 2B, there is illustrated a graph describing an alternative output gain function 220 of optical amplifier 115 with respect to wavelengths 225. The optical amplifier 115 produces a higher gain in lower wavelengths and a lower gain in higher wavelengths. Therefore, to compensate the alternative output gain function 220, a transfer function 230 is applied to the amplified signal 120 which attenuates the lower wavelengths to a higher degree and the higher wavelengths to a lower degree.

Referring now to FIG. 3, there is illustrated a block diagram of an exemplary equalizer 125 which can be used to produce transfer functions to compensate for tilted or more complexly varying gains among amplified signals 120. The equalizer 125 includes a beam displacer 319, a crystal 325, liquid crystals 330, 335, and 340, polarizer or PBS 345, and a recombining element 350. The beam displacer 319 receives and separates the incoming light signal 120 into two orthogonally polarized light beams 303a–b. One of the light beams, e.g., light beam 303a is propagated along the direction of the incoming light signal 120, while the other light beam, e.g., light beam 303b is refracted along another direction. At the output of the beam displacer, at the output of beam 303a, a halfwave plate is provided to properly orient the polarization of the beam 303a for its passage through subsequent elements in the optical path.

Each beam 303a–b is propagated through the crystal 325, and liquid crystals 330, 335, and 340. The crystal 325, and liquid crystals 330, 335, and 340, polarizer 345 and recombining element 350 can be positioned in a manner to receive directly the light beams 303a–b. Alternatively, light beam 303b can be redirected to these elements by a redirecting element (see, e.g. FIG. 16, element 2145). Where the light beams are to be aligned in polarization with subsequent elements such as polarizing beam splitters or other polarization-dependent elements, halfwave plates or polarization rotators may be provided to rotate the polarization of one or both of the beams 303a–b.

The crystal 325 and liquid crystals 330, 335, and 340 collectively form a crystal set 365, i.e. a collection of at least one or more crystal elements, and in the embodiment shown in FIG. 3, the crystal elements work together to impart controllable phase and amplitude changes upon the beams 303a–b which pass through the crystal set 365. For example, in the embodiment of FIG. 3, the phase-altering liquid crystal 335 is controlled by the Vp voltage to impart a variable phase change upon the beams 303a–b. The phase-altering liquid crystal 335 imparts the phase change because of its voltage-variable retardation coefficient; in other words, the liquid crystal variably retards the phase of the beams according to the voltage applied to it. The amplitude-altering liquid crystals, 330,340 work by polarization-dependent coupling. An ideal polarization filter will pass 100% of a light beam which has a polarization exactly aligned with the polarization filter or polarizer and will pass 0% of a light beam which has a polarization exactly orthogonal to the polarization of the filter. Between the two extremes of 0% and 100%, a variable amount of light will pass through a polarization filter according to the component of the polarization vector that is aligned with the polarization filter. Because liquid crystals will twist the polarization of an optical signal, a voltage, Va, can thus be used to variably adjust the polarization of the beams passing through them according to the voltage applied. The amplitude control voltage, Va, is applied in common or differentially to both crystals of the amplitude-altering pair of liquid crystals 330,340.

Techniques for modulating amplitude and phase of optical signals can be further understood by review of texts such as Bahaa E. A. Saleh and Malvin C. Teich, FUNDAMENTALS OF PHOTONICS (John Wiley & Sons, Inc. 1991), which is incorporated by reference herein.

Crystal set 365 together with polarizer 345 forms a harmonic filter 355 which is operable to receive light which has been polarized by beam displacer 319. The harmonic filter 355 selectively attenuates portions of an input light signal 120. An equalizer 125 may use multiple cascaded harmonic filters 355 to define its transfer function, as further described in FIG. 5. Equalizers comprising a single harmonic filter, like equalizer 125 of FIG. 3, compensate for tilted gain and therefore are sometimes referred to generally as "tilters."

The actual transfer function generated by another exemplary equalizer 125 is illustrated in FIG. 4. In this embodiment, the level of attenuation performed by equalizer 125 varies sinusoidally with respect to wavelength as illustrated by curve 405. The amplitude 410 and phase 415 of the sinusoidal transfer function can be adjusted to implement a particular transfer function such as, for example, equalizer transfer functions 215 and 230 illustrated in FIGS. 2A–2B. The crystal 325 of harmonic filter 355 generally determines the wavelength 420 of the sinusoid 405. The amplitude 410 is generally set by the outer pair of amplitude-altering liquid crystals 330,340, which are controlled by application of a control voltage VA, thereto. The phase 415 is generally set by the inner, phase-altering liquid crystal 335. This liquid crystal 335 is controlled by application of a control voltage VP, thereto. In each case, the control voltage is generally an analog control voltage, which serves to adjust the amplitude or phase of the light beam passing through the appropriate liquid crystals. The liquid crystals do not need to be arranged exactly as described here. For example, the phase-altering liquid crystal 335 could be positioned between the liquid crystal 330 and crystal 325.

The harmonic filter 355 uses crystal set 365 working with polarization beam splitter 345 to remove unwanted harmonic components from beams 303a–b. The beams 303a–b are then received by recombining element 350 which recombines the beams 303a–b. The resulting signal is the equalized signal 128.

The target transfer function can be generated by the harmonic filter 125 by adjusting the control voltages to control the amplitude 410 and phase 415 of the sinusoid. For example, wherein the equalizer transfer function requires a lower degree of attenuation for lower wavelengths, the amplitude 410 and phase 415 can be adjusted in a manner that the falling arm 417b of the sinusoid 405 coincides with the wavelengths amplified by the optical amplifier 115. Alternatively, wherein the equalizer transfer function requires a higher degree of attenuation for lower wavelengths, the amplitude 410 and phase 415 can be adjusted such that the rising arm 417a of the sinusoid 405 coincides with the wavelengths amplified by the optical amplifier 115.

Referring now to FIG. 5, there is illustrated a graph of another exemplary gain function 505 with respect to wavelength which can be associated with the optical amplifier 115 for the 1520–1570 nm wavelength ranges. A preferred transfer function to compensate for the gain response of this optical amplifier 115 is described by curve 510. For this type of gain response, the target equalizer transfer function 510 cannot be accurately approximated by a portion of a single sinusoid 405. The equalizer transfer function 510 is therefore treated as a repeating function with a period equivalent to the range of the optical amplifier 115. A periodic function with a finite period can be expressed as a series of sinusoidal functions, wherein each of the sinusoidal functions has a period equal to the finite period divided by an integer. The foregoing series of harmonics comprises a frequency-domain series, which would include Fourier series, and a given frequency domain series can be summed together in order to approximate a certain frequency domain signal. The summing of the frequency-domain elements of the frequency-domain series comprises a frequency-domain series approximation, which is the sum of a number of functions of the form. Therefore, an ideal equalizer transfer function 510 which would compensate for prior optical element wavelength-dependent transfer function variations can be approximated by the equalizer 125 through the use of multiple harmonic filters 355.

Figure 6A:
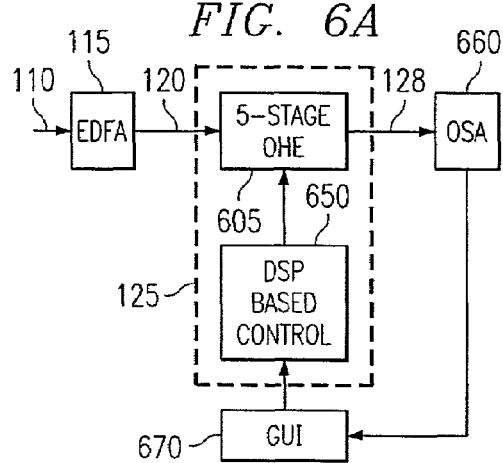
FIGS. 6A–6B are block diagrams of an optical harmonic equalizer and associated control circuitry.
Figure 6B:
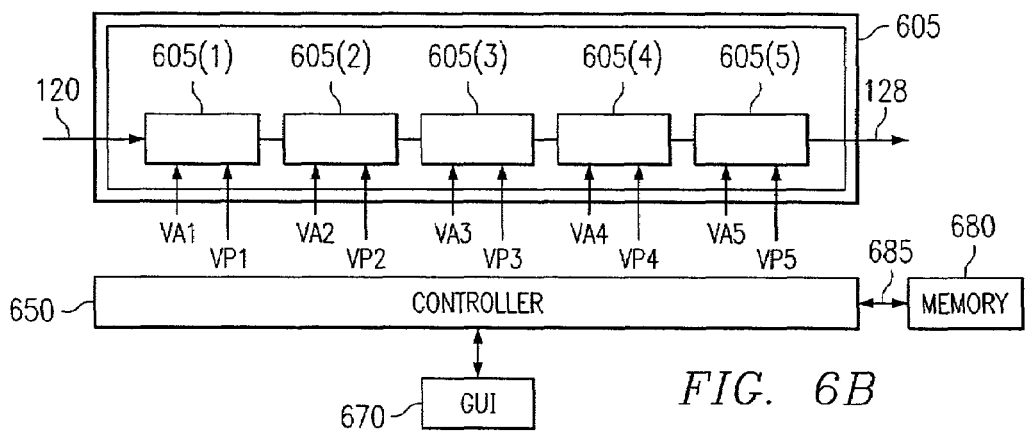

Referring now to FIGS. 6A–6B, illustrated are block diagrams describing an exemplary equalizer 125 which includes a number of harmonic filters 605(1) . . . 605(N) cascaded with one another. An equalizer, which includes a number of harmonic filters cascaded with one another, is known as an optical harmonic equalizer. Each harmonic filter 605 selectively attenuates a portion of a signal. The level of attenuation generally varies sinusoidally with the wavelength of the signal, wherein the transfer function of the harmonic filter are sinusoids with a period equal submultiples of the wavelength breadth of the signal of interest from the optical amplifier or other optical element 115. In other words, if the wavelength range of interest is 50 nm (such as for the C-band range of 1520–1570 nm), then the period of the harmonic filters will be 50 nm, 25 nm, 16.667 nm, 12.5 nm, and 10 nm, etc.

Where "P" represents power and Tn represents the transfer function of the nth harmonic filter, the following mathematically represents a mathematical algorithm that can be applied to compute the necessary phase and amplitude frequency-domain coefficients:

For given target: $\Delta ref = P_{target} - P_{input} = 10\log_{10}(T1_{ref}) + \ldots + 10\log_{10}(T5_{ref})$.

Based on Fourier analysis $\Delta ref$ can be decomposed as following: $\Delta ref = C_{0(ref)} + \Sigma Cn_{(ref)} Sin(n\omega t + \theta n_{(ref)})$, Where $Cn_{(ref)}$ & $\theta n_{(ref)}$ are magnitude and phase of Nth harmonic.

For each harmonic component $Cn_{(ref)} Sin(n\omega t + \theta_{(ref)})$:
  (1) The phase $\theta n_{(ref)}$ corresponds to the phase of transmission function $Tn_{ref}$,
  (2) The magnitude $Cn_{(ref)}$ is generally proportional to the magnitude of transmission function $Tn_{ref}$.

An exemplary algorithm thus would be to monitor the output, using, for example, an optical spectrum analyzer 660, measuring the transfer function of the equalizer as the "delta" or $\Delta$ between the output power spectrum ($P_{output}$) and input power spectrum ($P_{input}$). The algorithm thus monitors the output power spectrum and subtracts the input power spectrum to find the delta power spectrum or transfer profile of the equalizer 125. The delta power spectrum is then decomposed into its components as described above, and those components can be compared to similarly decomposed components of the reference or target transfer function of the equalizer (i.e., compare $\Delta$ and $\Delta_{ref}$). Based on the magnitude and phase comparison between these frequency-domain components, the algorithm adjusts the control voltages (as described below) to each stage to make sub-harmonic components of same order be close to each other. The net effect of having these sub-harmonic components of the same order approach each other will be to also make the actual output power spectrum approach the target output power spectrum.

Each of the harmonic filters 605(1) . . . 605(N) are controlled by corresponding amplitude control voltages, VA(1) . . . VA(N), and corresponding phase control voltages VP(1) . . . VP(N). The amplitude control voltages VA(1) . . . VA(N) control the amplitude 410 of the sinusoid 405 of the harmonic filter associated therewith, while the phase control voltages VP(1) . . . VP(N) control the phase 415 of the sinusoid 405. By applying amplitude voltages VA(1) . . . VA(N) and phase control voltages VP(1) . . . VP(N), equalizer 125 archives a selectively determined transfer function, such as transfer function 510. The amplitude control voltages VA(1) . . . VA(N), and the phase control voltages VP(1) . . . VP(N) are applied by a controller 650, according to an algorithm or look-up table values in a memory 680, and those values would generally be predetermined at some point prior to operation of the control algorithm based on the performance characteristics of the filter stages in the equalizer. In other words, it might be determined that certain absolute values of voltages (VA1) . . . VA(N) and VP(1) . . . VP(N) would impart certain phase shifts and amplitude changes upon an incoming optical signal. Alternatively, it might be determined that certain shifts in voltages would modify the phase shifts and amplitude changes in a certain way. In either case, the effect of these voltage changes upon the phase and amplitude of signals passing through the filter stages could be algorithmically calculated as a part of the control algorithm, or they could be determined as a part of that control algorithm by looking up the appropriate voltage values based on the desired harmonic component changes.

Still referring to FIGS. 6A–6B, in a preferred approach, a DSP-based control algorithm is used for providing the control voltages VP(1) ... VP(N) and VA(1) ... VA(N). The algorithm runs on the controller 650, by drawing its executable instructions from a memory 680, which may be an external memory or a memory embedded within the controller itself. The same memory 680 or a different memory can also be used to store temporary values used by the control algorithm and the same memory 680 or a different memory can also be used for storage of a look-up table correlating control voltage signals VA and VP to desired frequency-domain coefficients of amplitude and phase (or magnitude shifts relating to those components) within the equalizer's multiple filter stages. A Graphical User Interface (GUI) 670 is provided through which a user can configure or set parameters for the control algorithm.

The output of the equalizer 125 may be a flat, constant power level based on a particular input signal, but other output levels may be sought after as well. This "target equalization function" is a function of the system into which the equalizer 125 is to be placed, according to other optical elements in the system. In order to achieve the target equalization function, the equalizer is configured based upon the input profile to achieve as nearly as possible the target equalization function. The target equalization is referred to here as the "target transfer function," which essentially is the ideal equalization curve that the equalizer 125 is configured to approximate as nearly as possible. The actual equalization performance of the equalizer 125 is referred to as its "transfer function." The task of the control algorithm is to make the actual transfer function of the equalizer 125 as close as possible to the target transfer function.

The control algorithm preferably measures its success in approximating the target transfer function through the use of an optical spectrum analyzer 660, the output of which is provided to the GUI and in turn to the controller 650. The memory 680 stores the instructions, which are provided to the controller 650 through an interface 685 executable by the controller 650. The executable instructions cause the controller 650 to operate as described with respect to these and subsequent figures in this specification.

While the control algorithm preferably operates on a DSP-based system as described above, it could also be run on a general-purpose microprocessor or other microcontroller. The controller 650 may be on one integrated circuit, and the memory 680 can be on the same integrated circuit or on another one. The GUI is an optional means of configuring the control algorithms and providing parameters for the control algorithms' operation, but other non-GUI approaches can be provided. Further, the user interface may be located remotely from the controller 650 and/or the equalizer 125, such as through the Internet or through another computer network. An exemplary GUI interface is illustrated in FIG. 7 and described in the accompanying text.

Figure 7:
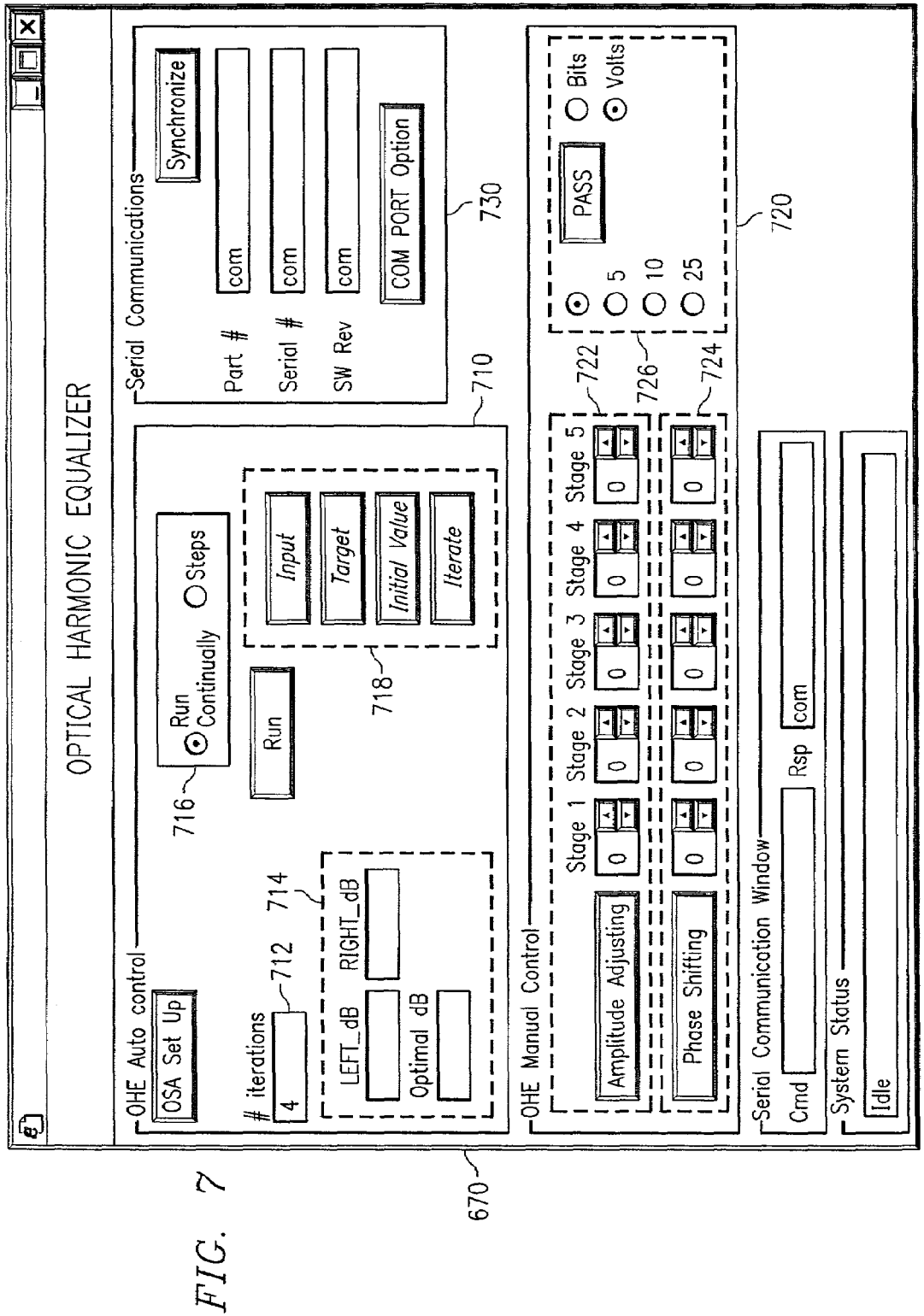
FIG. 7 is an exemplary Graphical User Interface through which a user can configure an optical harmonic equalizer.

FIG. 7 provides an exemplary GUI 670, which can be used to configure the DSP-based control algorithm to be run on the controller 650. This GUI 670 preferably contains three major sections, which are automatic control configuration section 710, a manual control configuration section 720, and a "Serial Communications" section 730.

The automatic control configuration section 710 allows the user to configure the control algorithm with variables, such as the number of iterations to be used, through the input box 712. The automatic control configuration section 710 also provides an output spectrum control section, which allows for configuration of the ideal equalizer 125 output to be flexible. Thus, the target output power spectrum can be other than a flat, equalized line. For example with the dB level section 714, two dB setting inputs, LEFT_dB and RIGHT_dB, can be used to set the relative equalized output of the lower wavelength (LEFT_dB) vs. the higher wavelength (RIGHT_dB). If LEFT_dB is set equal to RIGHT_dB, then the target output to the equalizer will be a flat-line output having no variation in its output spectrum in the wavelength/frequency domain. If, however, the LEFT_dB is set higher than the RIGHT_dB, then the target power spectrum of the equalizer will be tilted—decreasing in gain from shorter wavelengths to longer wavelengths. If the LEFT_dB is set to lower than the RIGHT_dB, then the target power spectrum of the equalizer will be tilted the other way—increasing in gain from shorter wavelengths to longer wavelengths. In this way, the target power spectrum of the equalizer can be modified to pre-compensate for subsequent components in the optical path, while the equalizer is still compensating dynamically for changes in the gain of the amplifier which comes before it in the optical path. Although this modification of the target power spectrum is described here as a linear tilting of the target power spectrum, the equalizer configuration set-up could be adapted to allow more refined pre-compensation. For example, there could be a LEFT_dB, CENTER_dB, and RIGHT_dB input which would allow the pre-compensation to be triangular (i.e., lower or higher in the center of the wavelength band relative to both outputs). Alternatively, the inputs can be adapted to allow linear tilts, which increase or decrease, over their relative wavelength subsections. With additional inputs or with a graphical input, a much more complicated pre-compensation could be defined into the target power spectrum.

Within the automatic control configuration section 710, clickable targets 716 may be provided for determining whether the control algorithm runs continually, upon clicking of the "Run" button, or in Steps, based on parameters set using the preferred "Input," "Target," "Initial Value," and repeated pressing of the "Iterate" button. The menu of clickable targets for the "Steps" approach are found within the group of clickable targets 718. The advantage of using the "Steps" approach is that it allows the user to see the effect of each iteration, especially when the system is going through initial evaluations, this allows the user to make sure that each iteration of the control algorithm is in fact moving the actual power spectrum closer to the target power spectrum. The "Target" button within the clickable targets 718 instructs the controller 650 to compute the target transfer function based upon the power spectrum of the input optical signal and the target power spectrum of the output optical signal. An "Initial Value" button is provided by which the user instructs the controller 650 to compute initial control voltages for the filters 605 according to an algorithm or look-up table values (e.g., a "translator table"). These initial values may be based on characterization data which was collected on the equalizer, for example, at time of assembly/manufacture of the equalizer or at another time. The initial values could also be based, alternatively or in addition to the characterization data, on the power spectrum of the input optical signal.

The manual control section 720 allows a user to specify the values for the amplitude factors 722 and phase shift factors 724 for each stage. In this embodiment, there are five stages of filtering for the equalizer, although the algorithm can be adapted for fewer or more stages. The Manual Control section 720 also allows a user to manually specify the accuracy with which the target power spectrum must be matched by using the clickable targets 726. The manual control section 720 also gives a user great flexibility in troubleshooting the equalizer 125. For example, by setting the amplitude adjusting coefficient to "0" for each stage but one, the user can remove the effect of all the harmonic filters 605 except for a single filter of interest, and then by varying the control voltages to that single filter of interest, the user can assess the operation of the singular harmonic filter 605.

The "Serial Communications" section 730 allows the GUI to interface with a variety of optical spectrum analyzers 660 according to configurable interface specifications with those analyzers. Other inputs can be provided here to allow the GUI and the control algorithm to be more specifically customized depending on the equipment and processors with which they communication.

Figure 8:
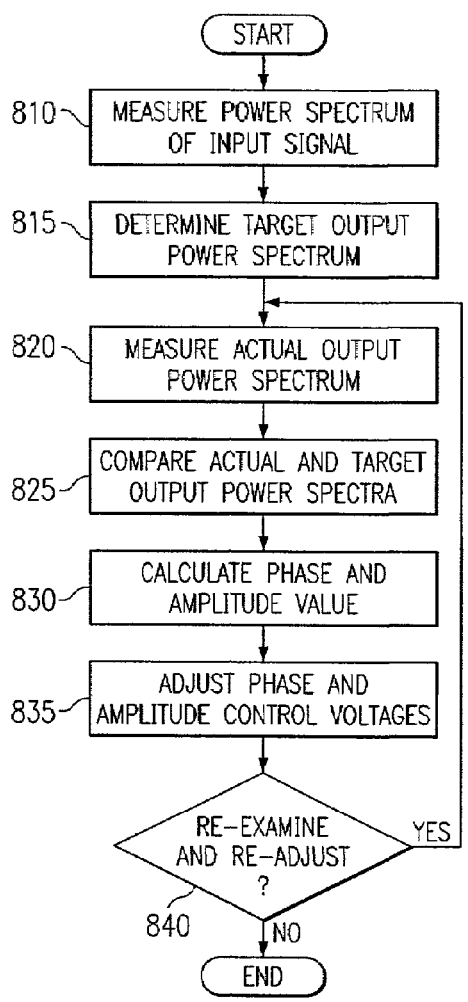
FIG. 8 is a flow diagram describing the control of harmonic filters.

Referring now to FIG. 8, there is illustrated a flowchart describing the control of the harmonic filters 605. At step 810, the amplified signal 120 is examined and the power spectrum of the amplified signal 120, which is the input signal to the equalizer 125, is measured. The GUI 670 is configured such that it is possible to measure the input signal using only the optical spectrum analyzer 660 at the output of the equalizer 125. This is done by selecting the "Input" target 718, which allows the signal to pass through the equalizer 125 without influence of the filters contained in the equalizer, thereby giving the controller a baseline reference input signal power spectrum, which can be subtracted from the target output spectrum to arrive at a target transfer function for the equalizer.

At step 815, the target output power spectrum is determined based potentially on pre-compensation for subsequent elements in the optical signal path. The target output power spectrum is set according to the overall gain profile which is desired after all the optical components leading up to and through the equalizer 125, and this determination could also occur prior to initiation of the algorithm shown in FIG. 8, or it could be a default output power spectrum, such as a default flat output power spectrum.

During step 820, the actual output power spectrum (as opposed to the target output power spectrum) from the equalizer 125 is determined. The task of the control algorithm is then to control the equalizer 125 in order to make the actual output power spectrum as close as possible to the target output power spectrum. Thus, at step 825, the target and actual output power spectra are compared. The comparison preferably breaks down the difference between the actual transfer function and the target transfer function into harmonic component values, such as Fourier harmonic component amplitude and phase constants. The control algorithm will then at step 830 calculate desired phase and amplitude shifts for each of these components such that the actual output power spectrum more closely matches the target output power spectrum.

When the control algorithm operates a multistage optical equalizer 125, it then controls those multiple stages according to the harmonic component value changes calculated in step 830. This is done at step 835 by dynamically controlling the control voltages to the individual stage filters 605 (1 . . . N) within the equalizer 125. More specifically, at step 825 the difference between the target and actual output power spectra are calculated, and the signal is broken down in the frequency domain into harmonic components, the addition of which will in the aggregate approximate the target transfer function. The stages of the equalizer 125 can be set up to coincide with those harmonic components.

According to those harmonic components of the difference between the target and actual output power spectra, the control algorithm will adjust the individual filter elements 605 (1 . . . N) according to an algorithm or look-up table that correlates desired amplitude and phase constants, or amplitude and phase constant changes, with control voltages to the individual filters 605 (1 . . . N).

At step 840, a determination is made whether to reexamine and readjust the amplitude and phase control voltages VA, VP, depending on whether the actual output power spectrum is close enough to the target output power spectrum, or the process can terminate after a certain number of iterations. The determination can be based, for instance, on whether the calculated amplitude and phase voltages differences during step 830 are lower than a predetermined threshold (perhaps by summing the squares of the amplitude harmonic components of the difference between the target and actual output power spectrum at the equalizer output). Alternatively, the determination can be made after a predetermined number of iterations, or if the algorithm is failing to converge toward the target output power spectrum. Wherein a determination is made to reexamine and readjust the phase control voltages VA, VP, steps 820–835 are repeated; otherwise the process ends.

Figure 9:
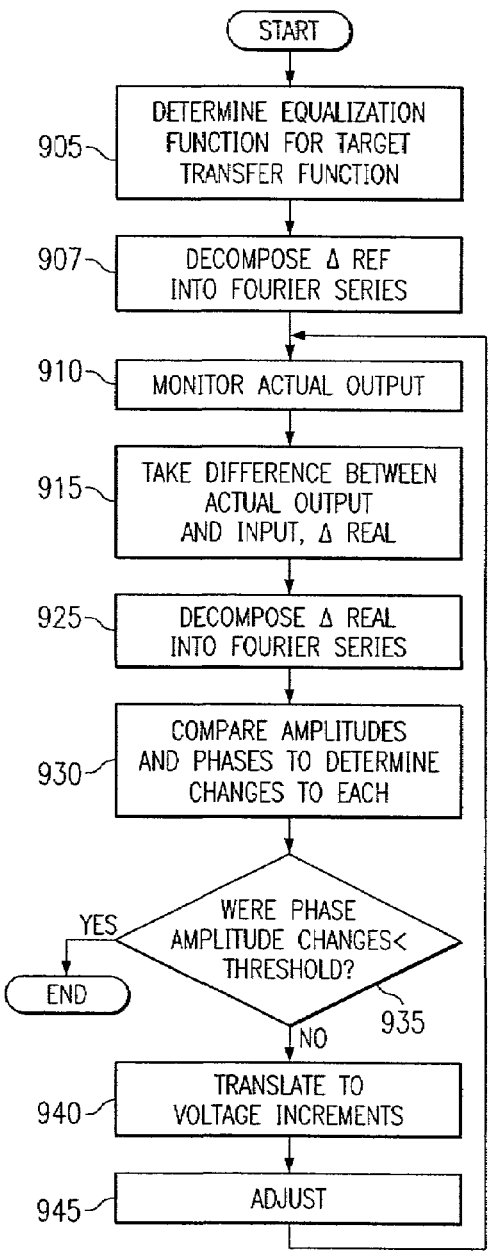
FIG. 9 is a flow diagram describing a technique for controlling multiple harmonic filters.

Referring now to FIG. 9, there is a flowchart describing another technique for controlling the equalizer 125. Depending on where the power spectra are measured, it may be desirable to use as a baseline measurement, the transfer function of the equalizer 125, rather than using a target output power spectrum as the benchmark. This technique describes a process for optimizing the equalizer 125 to a "target transfer function" (ΔRef), but it also describes other techniques or steps which may be applied in the context of the FIG. 8 discussion or in other contexts. Accordingly, the scope of the invention is set forth in the claims to it and not in the specific embodiments described here. The flowchart of FIG. 9 provides an exemplary technique by which a control algorithm adjusts the actual transfer function (ΔReal) of an equalizer 125 to approximate a target transfer function (ΔRef) in the instance where an optical harmonic equalizer 125 is controlled using Fourier series approximations of the target transfer function (ΔRef) and the actual transfer function (ΔRef), or a Fourier series approximation of a measured spectral difference function between the target transfer function and equalizer transfer function (ΔRef−ΔReal).

In this technique, at step 905, the target transfer function (ΔRef) is determined. The target transfer function is determined by measuring the spectral energy of the amplified signal 120 and subtracting the spectral energy of that input from a target output power spectrum.

At step 907, the target transfer function, which is a theoretical transfer function of the equalizer 125 for a given input which would produce the target output power spectrum, is decomposed into a first harmonic series, such as a Fourier series. The Fourier series representation of the signal comprises a series of sinusoids, each of which are associated with a particular filter stage within the equalizer, and each of which has a certain wavelength, amplitude, and phase.

At step 910, the spectral energy of the output signal is measured. The difference between the spectral energy of the output signal and the input signal is measured in step 915, yielding a measurement of the actual transfer function of the equalizer 125. As with the system described in FIG. 8, the difference in spectral energy of the output signal and the input signal is indicative of the level of attenuation with respect to wavelength provided by the optical harmonic equalizer 125.

At step 925, the actual transfer function of the optical harmonic equalizer 125 is decomposed into a second Fourier series, also represented by a series of sinusoids with particular wavelengths, amplitude, and phases. The amplitudes and phases of the first Fourier series are compared to the amplitudes and phases of the corresponding elements in the second Fourier series for each wavelength during step 930, and the differences are determined.

At step 935, the differences between the amplitudes and phases are compared in the Fourier domain to a threshold to determine whether the actual transfer function or attenuation of the optical harmonic equalizer 125 has converged sufficiently to the target transfer function. For example, the mean square of the differences can be compared to a predetermined threshold or the maximum amplitude difference can be compared to a different predetermined threshold. If the differences exceed the threshold, at step 940 each of the differences are translated by the algorithm in order to effect voltage changes, where necessary, to the control voltages VA(1) . . . VA(N), and VP(1) . . . VP(N). Those voltage changes are applied to the filter stages at step 945.

Steps 910–945 are repeated in iterative fashion until the comparison at step 935 show the differences to be below the threshold—this threshold can be either a requirement that all or certain harmonic component differences are below a certain value, or it could be based upon a sum-of-squares or other averaging comparison to a threshold. In any case, once the threshold is greater than the computed differences, the actual transfer function of the optical harmonic equalizer 125 is deemed to be sufficiently close to the target transfer function, and the output signal of the optical harmonic equalizer 125 would then provide a sufficiently equalized amplified signal.

The foregoing control of the harmonic filters 605(1) . . . 605(N) achieves the target transfer function in an iterative manner. The harmonic filters 605(1) . . . 605(N) are adjusted and the attenuation function is monitored until the attenuation function approaches the target transfer function within a predetermined threshold. The foregoing can be achieved within a certain number of iterations, adjusting potentially all the filters at each iteration. Alternatively, the harmonic filters 605(1) . . . 605(N) can be adjusted one at a time. This technique is described below with respect to FIG. 10.

Figure 10:
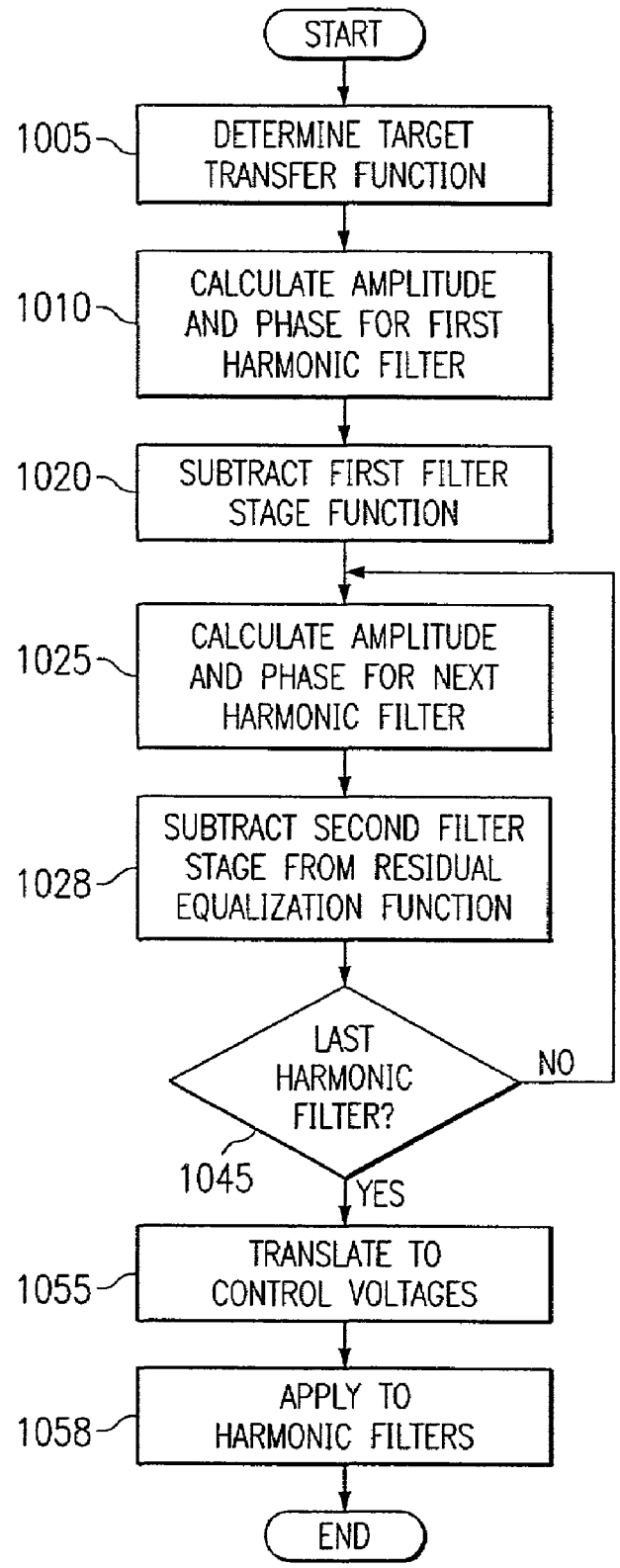
FIG. 10 is a flow diagram describing another technique for controlling multiple harmonic filters.

Referring now to FIG. 10, there is illustrated a flowchart describing the application of amplitude voltages VA(1) . . . VA(N), and phase control voltages VP(1) . . . VP(N) to equalize an amplified signal 120, in another manner. The control algorithm in this embodiment, like in FIG. 9, determines a target transfer function for the equalizer 125 and attempts to make the actual transfer function of the equalizer 125 as close as possible to the target transfer function.

At step 1005, the target transfer function is determined. The target transfer function is determined by subtracting the spectral energy of the amplified signal 120, which is the input to the equalizer 125, to the actual output power spectrum from the target output power spectrum. This subtraction indicates the shape of the equalization which is needed to yield the target output power spectrum, and therefore indicates the target transfer function. As before, the target output power spectrum may be a flat-line spectrum, or it may be linearly tilted or have a more complex shape to pre-compensate for subsequent optical elements in the optical signal path.

Each filter stage of the equalizer is capable (progressing from the first or lowest-frequency/longest-wavelength stage to the Nth or highest-frequency/shortest-wavelength stage) of refining the degree to which the equalizer 125 approaches the target transfer function. The first stage provides the broadest approximation to the target transfer function, while each subsequent stage adds further refinements to the prior approximation. Accordingly, it is possible to optimize the actual transfer function of the equalizer by successively bringing the different filter elements into the optical path filter by filter, from lowest-order element (e.g., n=1) to highest-order element (e.g., n=5 for a $5^{th}$-order harmonic filter).

At step 1010, the amplitude constant and phase constant of a sinusoidal function with a period equal to the wavelength of the first harmonic filter 605(1) is calculated which most closely approximates the target transfer function. This calculation could be based, for example, on an algorithm which minimizes the difference between the target transfer function and actual transfer function according to the mean square error of the difference between them.

At step 1020, the first-order approximation of the target transfer function, which approximation is made by the first-order filter element in the equalizer 125, is subtracted from the target transfer function. This subtraction will yield a residual equalization function which will comprise an error signal in the difference between the first-order approximation and the target transfer function. If subsequent filter stages can approximate the error signal, then when the responses from those subsequent filter stages are added to the first-stage filter response, the filters in the aggregate will more closely approximate the target transfer function.

Thus, during step 1025, the amplitude constant and phase constant of a sinusoidal function with a period equal to the wavelength of the next harmonic filter, e.g., harmonic filter 605(2), is calculated which most closely approximates the residual equalization function. At step 1028, this second filter stage transfer function is subtracted from the first residual equalization function, yielding a second residual equalization function. The second residual equalization function will be the error signal between the second-order approximation and the target transfer function. Steps 1025–1028 are repeated for each remaining harmonic filter 605(3) . . . 605(N), as determined at step 1045.

At step 1055, the amplitude constant and phase constant calculated during the preceding actions are translated into amplitude control voltages VA(1 . . . N) and phase control voltage VP(1 . . . N), which are then applied to harmonic filters 605(1 . . . N) at step 1058. The amplitude control voltages VA(1 . . . N) and phase control voltages VP(1 . . . N) can be algorithmically defined or defined in a look-up table in memory 680 or another memory. The translation between amplitude/phase constants of the harmonic components and the control voltages (VA and VP) may be based on theoretical values or may be configured on a unit-by-unit basis depending on the actual performance characteristics of the harmonic filters 605(1 . . . N). Similarly, it is possible to determine all the values algorithmically, applying all the values to the filter stages at one time at the end of the process, or to iteratively determine one stage's values, apply the control voltages to that stage, measure the actual residual, and then re-compute the control voltages to be applied at the next stage based on the measured values.

As shown and described in FIG. 3 and the accompanying text, the filtering of the optical signal is performed in these embodiments by preferably separating an optical signal into orthogonal components, i.e., a vertical and a horizontal polarized component. For the previously described embodiments, the relative paths of the two orthogonally polarized beams were not specified.

Each beam accordingly might propagate through the harmonic filters 605 from input to output spatially through different paths. Because of spatially dependent imperfections of optical components, however, resulting either from the component fabrication or the materials used, the orthogonal beams may behave differently depending on the optical paths which they traverse. This behavioral difference can adversely affect the final performance of an optical device, such as, for example, an optical equalizer or tilter. To alleviate these imperfections, the following disclosure provides for the two beams to propagate and counter-propagate an optical component assembly at the same spatial locations. Various architectures for propagating and counter-propagating two beams through a component assembly, i.e. an assembly of at least one optical components or elements, may be employed. A component assembly may, for example, comprise at least one harmonic filters 605 formed by using an arrangement of crystal sets and polarization filters.

To address the concern regarding spatially dependant performance differences between the orthogonally polarized beams as they traverse different routes within an equalizer, architectures of the type disclosed in FIGS. 11–18 may be used in conjunction with an equalizer having more than one harmonic filter 605. It should be appreciated, however, that the same architecture type may be used in conjunction with a tilter, having one harmonic filter 605, as well as other optical devices. The new-embodiment equalizers disclosed below can be used in the contexts described above by replacing the equalizer 125 in the above contexts with the new-embodiment equalizers (1125, 1275, 1375, 1475, 1500, 2125, 2200, 2300, and 2400: See below figures.) These equalizers may also be used in different contexts according to design needs. The common approach in all of the embodiments below is to pass the spatially separated, polarized components of the incoming beam 120 through the same optical path, but in opposite directions through the common path. In this way, spatially dependent effects (i.e., optical performance differences of the optical signal passing through the equalizer components) are mitigated by having the optical signals for both polarizations pass through the same path but in counter-propagating directions.

Figure 11:
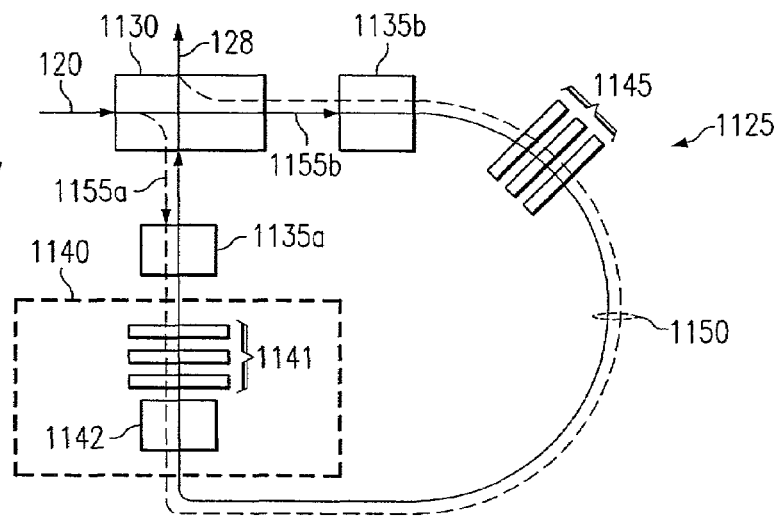
FIG. 11 is a conceptual diagram of a harmonic equalizer.

Referring now to FIG. 11, there is illustrated a conceptual diagram of an exemplary optical equalizer 1125 in accordance with one possible embodiment. This optical equalizer 1125 comprises a component assembly of a number of optical components. As illustrated, the optical harmonic equalizer 1125 includes a polarization-based routing element 1130, beam displacers 1135a–b, cascaded assembly 1140, and crystal set 1145. Cascaded assembly 1140 comprises a crystal set 1141 and a polarization filter 1142. At least one additional cascaded assembly 1140, crystal sets 1145 and/or other elements may be interposed between cascaded assembly 1140 and crystal set 1145. The polarization-based routing element 1130 may comprise, for example, a polarization beam splitter or another type of beam displacer such as a birefringent element. Beam displacers 1135a–b may be PBSs or polarizing glass. Crystal sets 1141 and 1145 may comprise liquid crystals, solid crystals, or other optical components, such as waveplates, which alter the phase and/or amplitude of an input beam. The beam displacers 1135a–b, the at least one cascaded assemblies 1140, and the crystal set 1145 are disposed in a path 1150, through which light beams 1155a and 1155b travel. The path 1150 is terminated at both ends by polarization-based routing element 1130. It should be appreciated that the path 1150 is preferably linear (as opposed to curved) and is formed through the use of reflectors or other elements that guide a beam from linear segment to segment. A reflector, such as, for example, a total internal reflection element, may be used to achieve a linear feedback path. It should also be appreciated that other elements may also be disposed along path 1150. All of the above described optical components and other components can be used to comprise a component assembly which acts as an optical equalizer in this or other embodiments described in this specification.

The polarization-based routing element 1130 separates amplified signal 120 into separate beams 1155a (indicated by dashed line) and 1155b (indicated by solid line) which are orthogonally polarized with respect to one another. Beams 1155a–b are depicted side-by-side for illustrative purposes only. In practice, each beam 1155a–b is propagated along the same spatial path 1150, or nearly the same spatial path, but in opposite directions. Beam 1155a is propagated through beam displacer 1135a, at least one cascaded assemblies 1140, crystal set 1145, beam displacer 1135b, and back to polarization-based routing element 1130. Similarly, beam 1155b is propagated through beam displacer 1135b, crystal set 1145, a corresponding number of cascaded assemblies 1140, beam displacer 1135a, and back to polarization-based routing element 1130.

Each crystal set 1141 and 1145 is followed by a polarization filter 1142 or by a polarization-based beam displacer 1135a–b, and each crystal set/polarization element pair collectively form a filter stage, which selectively attenuates certain wavelengths of the beams 1155a–b that are associated with high gain factors from amplifier 1110.

For the first beam 1155a, each of the cascaded assemblies 1140 forms a filter stage. Moreover, crystal set 1145 and beam displacer 1135b form another filter stage. For the second beam 1155b, the crystal set 1145 and the polarization filter 1142 of the first cascaded assembly 1140 form one filter stage. The crystal set 1141 of each cascaded assembly 1140 and the polarization filter 1142 of the next cascaded assembly 1140 form additional filter stages. The crystal set 1141 of the last cascaded assembly 1140 and the beam displacer 1135a form an additional filter stage.

The optical circuit of FIG. 11 operates by splitting the incoming beam 120 into its vertical and horizontal polarizations and passes those horizontally and vertically polarized beams in opposite directions through the same optical components over the same path, but in different directions. In this manner, the spatially dependent optical propagation effects induced by the equalizer are minimized.

Figure 12:
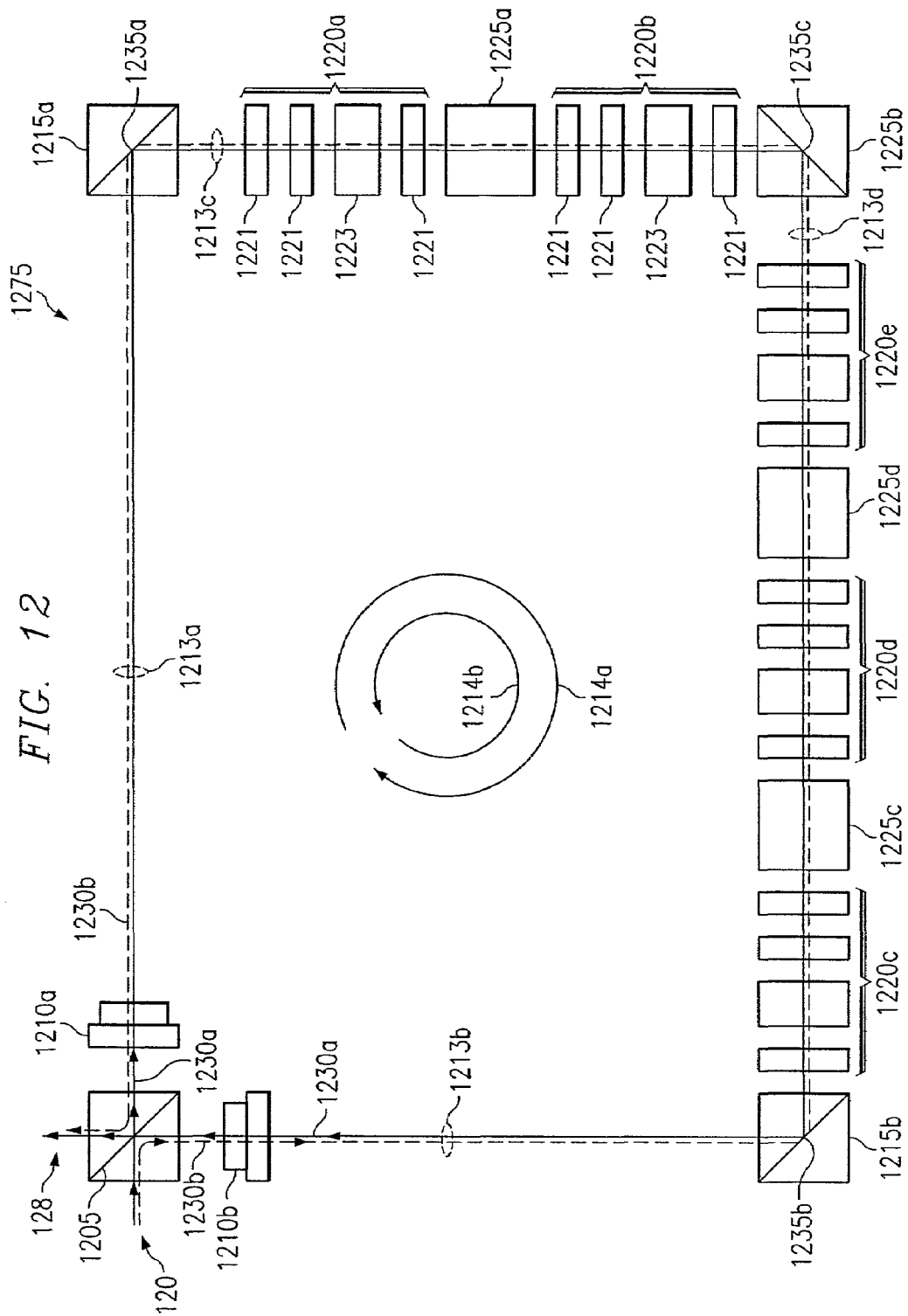
FIG. 12 is a block diagram describing a first optical harmonic equalizer.

Referring now to FIG. 12, there is illustrated a block diagram of an exemplary optical harmonic equalizer 1275 in accordance with a first embodiment. As described above, this embodiment splits an incoming optical signal 120 into two beams 1230a–b comprising the vertical and horizontal polarizations of the incoming optical signal 120. This is done to overcome the spatially dependent imperfections which may exist in the optical components used to form the equalizer 1275. Specifically, imperfections in the components of equalizer 1275 can be caused by various characteristics of the materials or the fabrication process. These imperfections can result in slightly differing optical properties at differing locations within each component. Propagating the polarized beams 1230a–b through the components of equalizer 1275 at the same spatial locations within each component causes the effect of the foregoing differing optical properties to be minimized and improves the performance of the optical equalizer 1275 and the quality of the equalized signal 128.

The optical harmonic equalizer 1275 includes a polarization beam splitter (PBS) 1205. Polarization rotators 1210a–b are disposed adjacent to the PBS 1205 and along path segments which are orthogonal to one another. Polarization rotator 1210a is also adjacent to a PBS 1215a while polarization rotator 1210b is also adjacent to a PBS 1215b. The PBS 1205, polarization rotator 1210a, and PBS 1215a are positioned substantially colinearly along a first path segment 1213a. PBS 1205, polarization rotator 1210b and PBS 1215b are also positioned substantially colinearly along a second path segment 1213b. In the illustrated embodiment, the polarization rotators 1210a–b are Faraday rotators, which polarize beams passing through them in one direction, while leaving unaffected beams passing through them in the opposite direction.

Adjacent to PBS 1215a are at least one crystal sets 1220 and at least one PBS 1225 positioned in cascade and alternating with respect to one another, such that the cascade begins with a crystal set 1220 and ends with a terminating PBS 1225. Each crystal set 1220 includes liquid crystals 1221 and at least one solid crystal 1223, which together alter the phase and/or amplitude of incoming light beams. OHE 1275 illustrated in FIG. 12 includes crystal set 1220a and PBS 1225a followed by crystal set 1220b and PBS 1225b positioned substantially colinearly along a third path segment 1213c, which is substantially at a right angle to the first path segment 1213a and parallel to the second path segment 1213b.

Similarly, adjacent to PBS 1215b are at least one crystal sets 1220 and at least one PBS 1225, positioned in cascade and alternating with respect to one another, such that the cascade begins with a crystal set 1220 and ends with a terminating PBS 1225. OHE 1275 illustrated in FIG. 12 includes crystal set 1220c and PBS 1225c followed by crystal set 1220d and PBS 1225d followed by crystal set 1220e and PBS 1225b positioned substantially colinearly along a fourth path segment 1213d, which is substantially at a right angle to the second path segment 1213b and parallel to the first path segment 1213a.

In operation, the optical harmonic equalizer 1275 receives the amplified signal 120 at PBS 1205. PBS 1205 splits the incoming beam into two orthogonally polarized beams, 1230a–b. Beam 1230a generally propagates along path 1213 in a forward propagation direction 1214a. Beam 1230b generally propagates along path 1213 in a reverse propagation direction 1214b. For example, beams 1230a–b are each guided along first and second spatial path segments 1213a and 1213b, respectively, through respective first and second polarization rotators 1210a and 1210b. Polarization rotator 1210a rotates the polarization of beam 1230a by ninety degrees. As a result, beam 1230a has the same polarization as beam 1230b. Beam 1230b propagates through polarization rotator 1210b in reverse direction. As a result, the polarization of beam 1230b is not altered.

The beams 1230a–b are then received by PBS 1215a and 1215b, at points 1235a and 1235b, respectively. PBS 1215a directs beam 1230a through crystal set 1220a, PBS 1225a, and crystal set 1220b to path-segment terminating PBS 1225b along path segment 1213c. PBS 1215b directs beam 1230b through crystal set 1220c, PBS 1225c, crystal set 1220d, PBS 1220d, and crystal set 1220e to path-terminating PBS 1225b along path segment 1213d. As noted above, the crystal sets 1220 selectively alter the phase and amplitude of the beams 1230a–b. The combination of each crystal set 1220/PBS 1225 pair therefore forms a filter stage.

Path-segment terminating PBS 1225b is positioned to receive both beams 1230a–b at a particular point 1235c. The terminating PBS 1225b separates the additional, unwanted harmonic components from the beams 1230a–b, wherein the additional harmonic components are passed through the PBS 1225b and are thereby not reflected onto the next path segment. Beam 1230a is directed by PBS 1225b along path segment 1213d through crystal sets 1220c–e and PBSs 1225c–d. PBS 1215b receives beam 1230a at point 1235b. Beam 1230b is directed along path segment 1213c through crystal sets 1220a–b and PBS 1225a. PBS 1215a receives beam 1230b at point 1235a.

PBS 1215b receives beam 1230a along spatial path segment 1213d at point 1235b and directs beam 1230a along spatial path segment 1213b through polarization rotator 1210b to the PBS 1205. Similarly, PBS 1215a receives beam 1230b along spatial path segment 1213c at point 1235c and directs beam 1230b along spatial path segment 1213a through polarization rotator 1210a to the PBS 1205. As beam 1230a passes through the second polarization rotator 1210b, the polarization is rotated back by ninety degrees, thereby resulting in the same polarization it had prior to passage through the first polarization rotator 1210a, which had originally rotated the polarization of the beam by ninety degrees when the beam passed through in the other direction. PBS 1205 combines the polarized beams 1230a–b to generate an equalized signal 128 as an output.

Polarized beams 1230a and 1230b each propagate through the components of optical equalizer 1275 along the same spatial paths 1213a–d as beam 1230b, but in an opposite direction of propagation. The beams 1230a–b are shown side-by-side for illustrative purposes only. In practice, they would propagate along identical or nearly identical spatial paths. Guiding the polarized beams 1230a–b along the same spatial paths as each other causes the polarized beams 1230a–b to traverse the same components of OHE 1275 in the same spatial locations.

The minimization of the effects caused by spatially dependent imperfections in the optical equalizer serves to reduce the Polarization Dependent Loss (PDL) which is otherwise introduced by polarization-dependent effects in the optical components.

Figure 13:
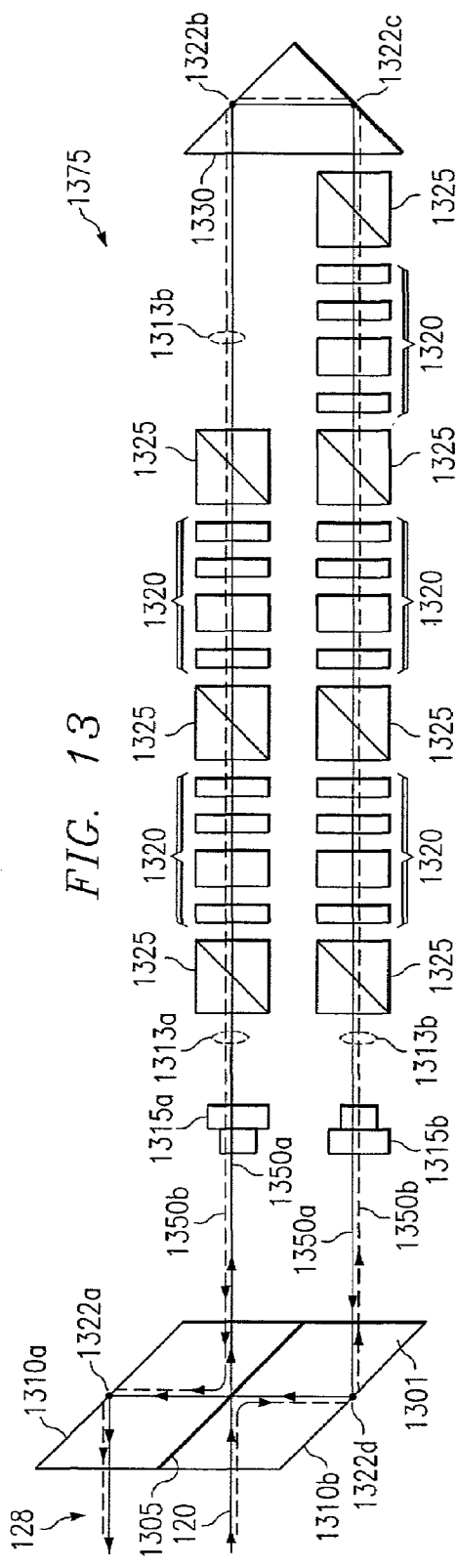
FIG. 13 is a block diagram describing a second optical harmonic equalizer.

Referring now to FIG. 13, there is illustrated a block diagram of another embodiment of an optical equalizer. The optical harmonic equalizer 1375 includes an optical component 1301 which in turn comprises a PBS 1305 and at least two reflective surfaces 1310a and 1310b. The reflective surfaces 1310a–b are disposed on opposite sides of the PBS 1305, and serve to reflect beams striking them from within the optical component 1301. A Faraday rotator 1315a is positioned along a first signal path segment 1313a. Polarization rotator 1315b is positioned along a second signal path segment 1313b.

Adjacent to polarization rotator 1315a are any number of PBSs 1325 and any number of crystal sets 1320. The PBSs 1325a and crystal sets 1320a are positioned in a cascaded arrangement and are alternating with respect to one another, such that the cascade begins and ends with a PBS 1325. Similarly, adjacent to polarization rotator 1315b are any number of PBSs 1325 and any number of crystal sets 1320 connected in cascade and alternating with respect to one another, such that the cascade begins and ends with a PBS 1325.

The optical equalizer 1375 receives the amplified signal 120 at optical component 1301. The signal 120 enters the optical component 1301 and is continues to the PBS 1305 within the optical component 1301. The PBS 1305 splits the incoming beam into two orthogonal polarized beams 1350a–b. Polarized beam 1350a is guided from PBS 1305 along spatial path segment 1313a through polarization rotator 1315a. Because beam 1350a goes through the polarization rotator 1315a in the reverse direction, it is unaffected. Beam 1350a is thereafter guided through at least one PBSs 1325 and at least one crystal sets 1320.

Beam 1350b is reflected by the PBS 1305 to reflective surface 1310b, where it is received and reflected at point 1322d. At point 1322d, reflective surface 1310b reflects polarized beam 1350b along spatial path segment 1313b through polarization rotator 1315b, which rotates polarized beam 1350b by 90 degrees. The beam 1350b passes through at least one PBSs 1325 and at least one crystal sets 1320. As noted above, each crystal set 1320/PBS 1325 pair forms a filter stage.

A reflective element 1330 receives beam 1350a at point 1322b and reflects beam 1350a to point 1322c. At point 1322c, the element 1330 reflects polarized beam 1350a along spatial path segment 1313b through crystal sets 1320, PBSs 1325, and polarization rotator 1315b, to PBS 1305. The reflective element 1330 receives polarized beam 1350b at point 1322c and reflects beam 1350b to point 1322b. At point 1322b, the reflective element 1330 reflects polarized beam 1350b along spatial path segment 1313a through crystal sets 1320, PBSs 1325, and polarization rotator 1315a. The polarization rotator 1315a rotates the polarization of beam 1350b back by ninety degrees, thereby resulting in the same polarization of beam 1350b that it had prior to its initial passage through polarization rotator 1315b.

Polarizing beam splitter 1305 receives polarized beams 1350a and 1350b and combines the polarized beams 1350a and 1350b, thereby resulting in equalized signal 128. Equalized signal 128 is guided to point 1322a of reflective surface 1310a and reflected. Guiding the polarized beams 1350a–b to traverse the same spatial locations within the PBS 1325 and crystal sets 1320 causes the effects of the differing optical properties due to imperfections in the materials and fabrication to be minimized. Accordingly, the performance of the optical harmonic equalizer 1375 and the quality of the equalized signal 128 are improved.

Figure 14:
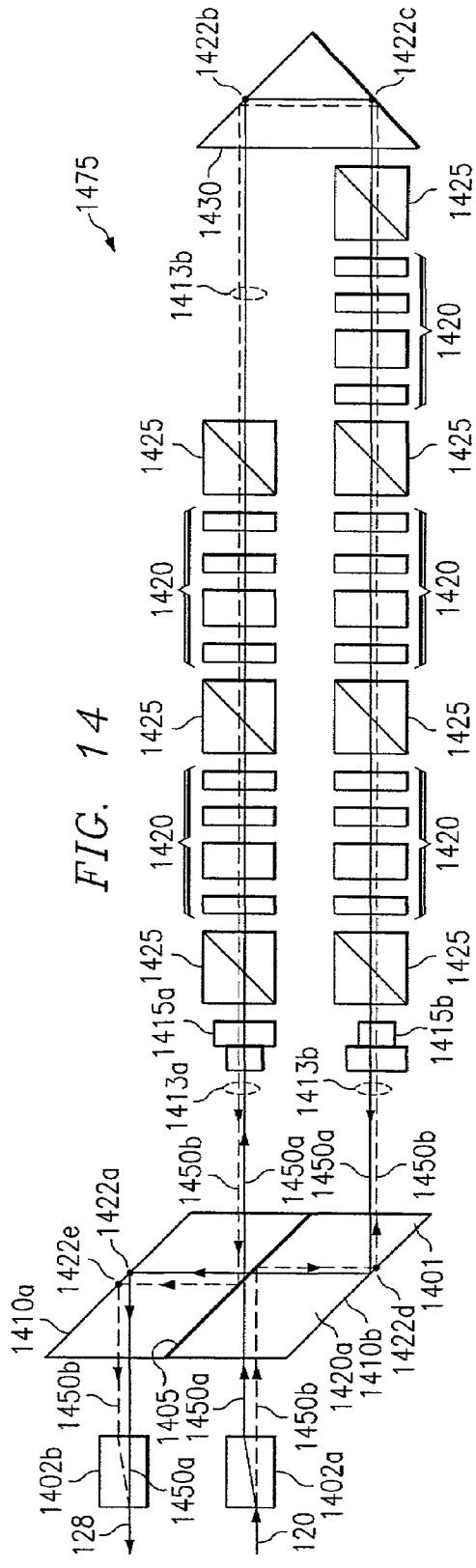
FIG. 14 is a block diagram describing a third optical harmonic equalizer.

Referring now to FIG. 14, there is illustrated a block diagram of an exemplary optical equalizer 1475 in accordance with another embodiment. The optical harmonic equalizer 1375 includes an optical component 1401 which in turn comprises a PBS 1405 and at least two reflective surfaces 1410a and 1410b.

The optical harmonic equalizer 1475 includes a beam displacer 1402a adjacent to the PBS 1405. The beam displacer 1402 may be a birefringent element or other element which is operable to spatially decompose an incoming signal into components parts. Polarization rotator 1415a is positioned along a first spatial signal path segment 1413a. Polarization rotator 1415b is positioned along a second spatial signal path segment 1413b.

Adjacent to polarization rotator 1415a are at least one of PBSs 1425 and crystal sets 1420. The PBSs 1425 and crystal sets 1420 are positioned in a cascaded arrangement and are alternating with respect to one another, such that the cascade begins and ends with a PBS 1425. Thus, to form a single filter stage along the signal path, there would be a crystal set 1420 interposed between a pair of PBSs 1425. Each PBS 1425 acts with the crystal set that precedes it in the optical path to form a harmonic filter. This is one reason why in the single-stage harmonic filter embodiment, there is a PBS 1425 positioned on each side of the crystal set 1420, so that one PBS 1425 acts with the crystal set 1420 for the beam proceeding in one direction and the other PBS 1425 acts with the crystal set 1420 for the beam proceeding in the other direction. The PBSs or polarization filters 1425 further serve to isolate the plurality of harmonic filter stages in an embodiment having a plurality of stages. The general description of the arrangement of PBSs or polarization filters here also can be applied in other embodiments set forth in this specification.

The polarization rotator 1415a, at least one of PBSs 1425, and at least one of crystal sets 1420 are disposed along a substantially straight line (spatial path segment 1413a). The polarization rotator 1415b, at least one of PBSs 1425, and at least one crystal sets 1420 are disposed along another substantially straight line (spatial path segment 1413b). Also disposed along both lines is a reflective element 1430.

The optical equalizer 1475 receives the amplified signal 120 at a beam displacer 1402a. The beam displacer 1402a spatially displaces the amplified signal 120 resulting in polarized beams 1450a–b. Beams 1450a–b are received by PBS 1405, which propagates beam 1450a and reflects beam 1450b toward reflective surface 1410b. Reflective surface 1410b receives polarized beam 1450b at point 1422d and reflects beam 1450b along spatial path segment 1413b through polarization rotator 1415b, at least one PBSs 1425 and crystal sets 1420 to point 1422c of reflective element 1430. Beam 1450a is propagated by PBS 1405 along path segment 1413a through polarization rotator 1415a, one or more PBSs 1425, and crystal sets 1420 to point 1422b of reflective element 1430.

Element 1430 receives polarized beam 1450a at point 1422b and reflects polarized beam 1450a to point 1422c, where reflective element 1430 reflects polarized beam 1450a along spatial path segment 1413b through crystal sets 1420 and PBSs 1425 and polarization rotator 1415b to point 1422d of reflective surface 1410b. Reflective surfaces 1410b and 1410a reflect beam 1450a to beam displacer 1402b.

Element 1430 receives beam 1450b at point 1422c and reflects beam 1450b to point 1422b, where element 1430 reflects beam 1450b along spatial path segment 1413a through crystal sets 1420, PBS 1425, and polarization rotator 1415a. Polarization rotator 1415a rotates the polarization of beam 1450b back by ninety degrees, thereby resulting in the same polarization of beam 1450b that it had prior to its passage through polarization rotator 1415b. Beam 1450b strikes PBS 1405 and is reflected to point 1422e. At point 1422e, polarized beam 1450b is reflected to beam displacer 1402b. Beam displacer 1402b receives the polarized beams 1450a–b and combines them, thereby resulting in an equalized signal 128.

Guiding polarized beams 1450a–b to traverse the same spatial locations within crystal sets 1420 and the PBSs 1425 causes the effects of the differing optical properties due to imperfections in the materials and fabrication to be minimized. Accordingly, the performance of the optical harmonic equalizer 1475 and the quality of the equalized signal 128 are improved.

Figure 15:
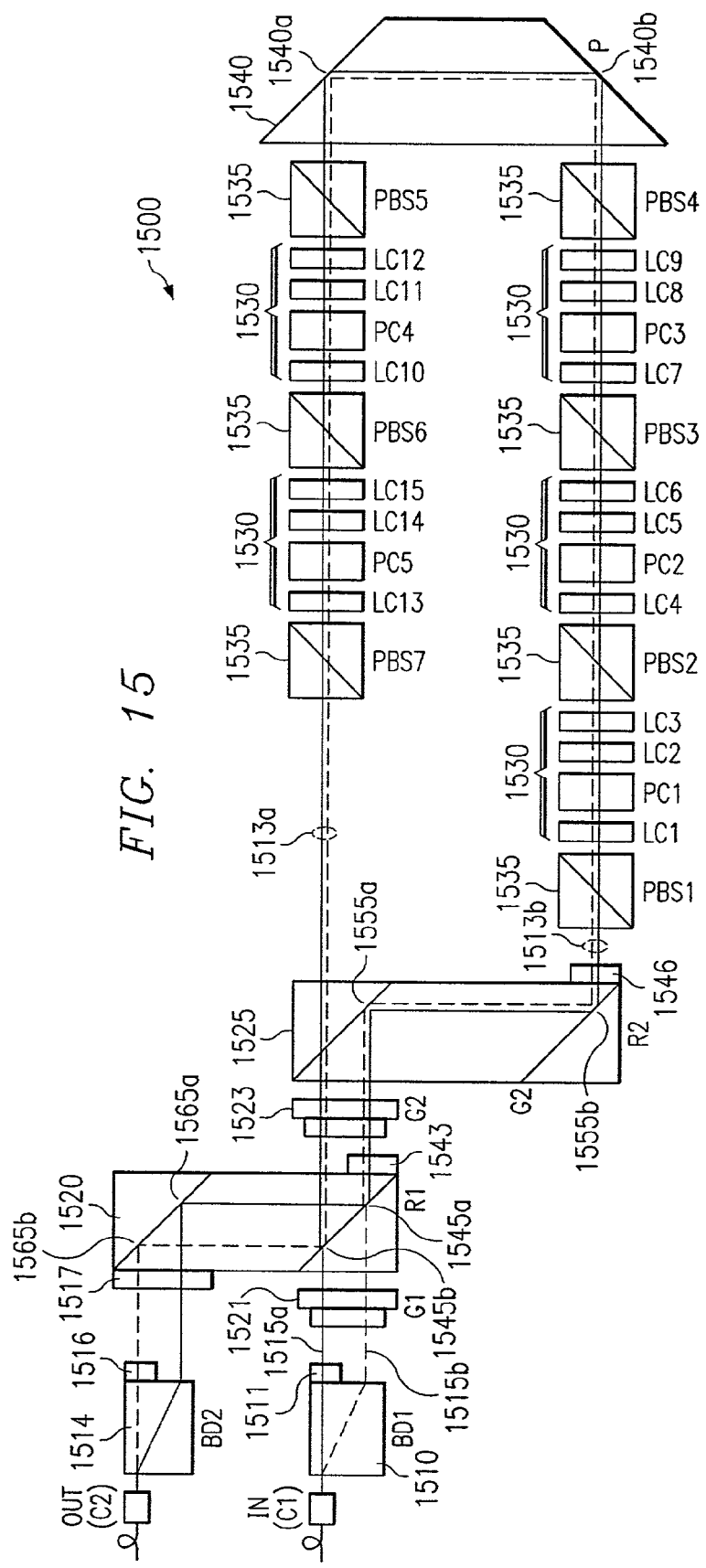
FIG. 15 is a block diagram describing a fourth optical harmonic equalizer.

Referring now to FIG. 15, there is illustrated a block diagram of an exemplary optical harmonic equalizer 1500 in accordance with another embodiment. This equalizer employs a pair of beam-displacing prisms or rhomboid prisms 1520,1525, which have internal surfaces which transmit, undeflected, light passing in one direction, while reflecting light passing through in the other direction. These rhomboid prisms serve as redirecting elements in the disclosed embodiments.

For brevity, the beam-displacing prisms are referred to below as "rhomboids," which is the specific shape of the most-common embodiment of these optical elements, but it should be understood that beam-displacing prisms of other shapes are contemplated.

The optical harmonic equalizer 1500 includes an incoming-signal beam displacer 1510 with an attached halfwave plate 1511, and an outgoing-signal beam displacer 1514 with an attached halfwave plate 1516. These beam displacers, 1510,1514, are placed on one side of rhomboid 1520, and a first polarization rotator 1521 is interposed between the incoming signal beam displacer 1510 and the rhomboid 1520. The second rhomboid 1525 is positioned adjacent to the first rhomboid 1520, but on the opposite side from the two beam displacers 1510,1514. A second polarization rotator 1523 is interposed between the first rhomboid 1520 and the second rhomboid 1525.

Along a first spatial signal path segment 1513a, and adjacent to the second rhomboid 1525, are at least one PBSs 1535, at least one crystal sets 1530. These PBSs 1535 and crystal sets 1530 are connected in cascade and alternating with respect to one another, such that the cascade begins and ends with a PBS 1535.

Along a second spatial signal path segment 1513b, which is parallel to the first spatial signal path segment 1513a, and also adjacent to the second rhomboid 1525, are at least one PBSs 1535 and at least one crystal sets 1530. The at least one PBSs 1535 and at least one crystal sets 1530 are connected in cascade and alternating with respect to one another, such that the cascade begins and ends with a PBS 1535. Signal path segment 1513b, like signal path segment 1513a, terminates at reflective element 1540.

In operation, the equalizer 1500 receives the amplified signal 120 at the beam displacer 1510, which splits the incoming beam into two polarized beams 1515a (indicated as a solid line) and 1515b (indicated as a dashed line). The polarization of beam 1515a is rotated ninety degrees by halfwave plate 1511 so that it has the same polarization at as beam 1515b. Both beams 1515a and 1515b then pass through a Faraday rotator 1521 in the reverse direction so the rotator has no effect. Polarization rotator 1521 is provided to filter out back-reflected optical signals returning from the filtering elements—small components of which might pass back through the beam displacer 1510 and degrade the incoming signal through reflections.

After passing through polarization rotator 1521 unaffected, beam 1515a is guided through rhomboid 1520, polarization rotator 1523 (in the reverse direction, leaving the beam unaffected), rhomboid 1525, and along spatial path segment 1513a through crystal set(s) 1530, PBS(s) 1535 and reflective element 1540.

Beam 1515b passes unchanged through polarization rotator 1521 and the first rhomboid 1520. The polarization of beam 1515b is rotated by ninety degrees upon exiting the first rhomboid 1520 by halfwave plate 1543. The second polarization rotator 1523 also leaves beam 1515b unaffected in its first pass through that polarization rotator 1523, since the beam 1515b passes through in the reverse direction. The beam 1515b is then received at the second rhomboid 1525 at surface 1555a and reflected to surface 1555b, at which point it is reflected into alignment with second spatial path segment 1513b. The polarization of beam 1515b is rotated again by ninety degrees by halfwave plate 1546. This polarization rotation allows the polarized beam 1515b to have the proper orientation to pass through crystal set(s) 1530 and PBS(s) 1535 to reflective element 1540.

The polarized beams 1515a–b are then received by reflective element 1540. The polarized beam 1515a is received at a point 1540a while polarized beam 1515b is received at a point 1540b. The reflective element 1540 reflects the polarized beam 1515a from point 1540a to point 1540b. At point 1540b, polarized beam 1515a is reflected along path segment 1513b, traversing through PBS(s) 1535 and crystal sets 1530 in the opposite direction from the travel of beam 1515a through these same elements. Halfwave plate 1546 rotates the polarization of beam 1515a such that at point 1555b, polarized beam 1515a is reflected to point 1555a, and at point 1555a, beam 1515a is reflected to polarization rotator 1523 and half wave plate 1543. Polarization rotator 1523 and halfwave plate 1543 rotate the polarization of beam 1515a such that rhomboid 1520 reflects signal 1515a toward beam displacer 1514. In particular, polarized beam 1515a passes through halfwave plate 1517 to beam displacer 1514. Because of the polarization rotation imposed by the halfwave plate 1517, beam 1515a, is refracted in the beam displacer 1514, such that it will be combined with polarized beam 1515b, which has followed a path described below.

The reflective element 1540 reflects polarized beam 1515b from point 1540b to point 1540a. At point 1540a, polarized beam 1515b is reflected along path segment 1513a through PBS(s) 1535, crystal sets 1530, and rhomboid 1525 to polarization rotator 1523 that rotates the polarization of beam 1515b such that rhomboid 1520 reflects beam 1515b toward beam displacer 1514. In particular, beam 1515b passes through halfwave plates 1517 and 1516 such that beam displacer 1514 combines polarized beams 1515a–b, thereby resulting in equalized output signal 128.

Beams 1515a–b are depicted side-by-side for illustrative purposes only. In practice, the beams 1515a–b are propagated along identical or nearly identical spatial paths, but in opposite directions. Guiding the polarized beams 1515a–b along the same spatial paths minimizes the effect of the varying optical properties of components, with respect to spatial location, and thereby improves the performance of the equalizer 1500 and the quality of the equalized signal 128.

Embodiments of the types disclosed in FIGS. 16–19, described below, may be used in conjunction with a tilter having a single harmonic filter 605. It should be appreciated, however, that the same architecture type may be used in conjunction with equalizers having multiple harmonic filters 605, as well as with other optical devices.

Figure 16:
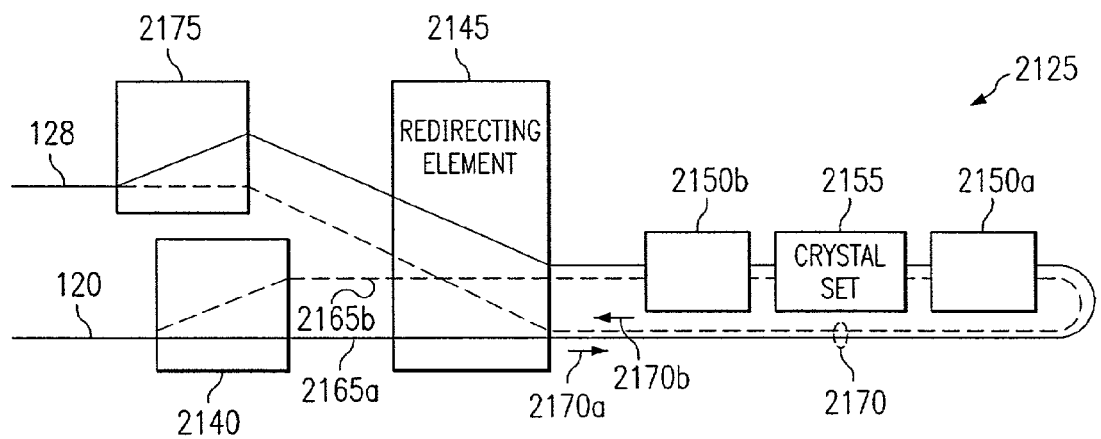
FIG. 16 is a conceptualized diagram describing an optical tilter.

Referring now to FIG. 16, there is illustrated a conceptual diagram describing an exemplary optical tilter 2125 in accordance with one embodiment. The optical tilter 2125 includes a beam displacer 2140 acting as a separating element, redirecting element 2145, polarization filter 2150a, crystal set 2155, polarization filter 2150b, and beam displacer 2175 acting as a combining element. The polarization filters 2150a–b may comprise, for example, polarization beam splitters (PBSs) or polarizers. The redirecting element 2145 may comprise, for example, a rhomboid or a beam displacer. The beam displacer 2140 separates an incoming amplified signal 120 into two orthogonal beams: beam 2165a and beam 2165b. A redirecting element 2145 is positioned to receive and propagate beams 2165a and 2165b.

Beams 2165a and 2165b are propagated along spatial path 2170 in opposite directions, 2170a and 2170b, respectively. The crystal set 2155 is disposed along path 2170 and alters the phase and/or amplitude of beams 2165a–b. Crystal set 2155 and polarization filter 2150a form a filter, preferably a Fourier harmonic filter, for beam 2165a. Crystal set 2155 and polarization filter 2150b form a filter, preferably a Fourier harmonic filter, for beam 2165b. After propagating along spatial path 2170, the beams 2165a and 2165b are received by redirecting element 2145 and guided to the beam displacer 2175, which serves as a combining element.

The beam displacer 2175 combines beams 2165a and 2165b, thereby resulting in equalized signal 128.

It should be appreciated that the path 2170 is actually linear (as opposed to curved) and is formed through the use of reflecting or refracting elements and/or fiber, which pass a beam from linear segment to segment. A reflector, such as, for example, a Total Internal Reflection (TIR) element, may be used to achieve a linear feedback path. Additionally, other elements not illustrated may also be placed along path 2170. Furthermore, a single component can serve in place of more than one of the above elements. For example, beam displacer 2140 may also be designed so as to also perform the combining function of beam displacer 2175.

Imperfections in the components can be caused by materials or the fabrication process. The foregoing can result in slightly differing optical properties at differing locations within the component. However, guiding the polarized beams to traverse the same spatial locations within the components causes the effect of the foregoing differing optical properties to be minimized and improves the performance of the optical tilter and the quality of the equalized signal 128.

Figure 17:
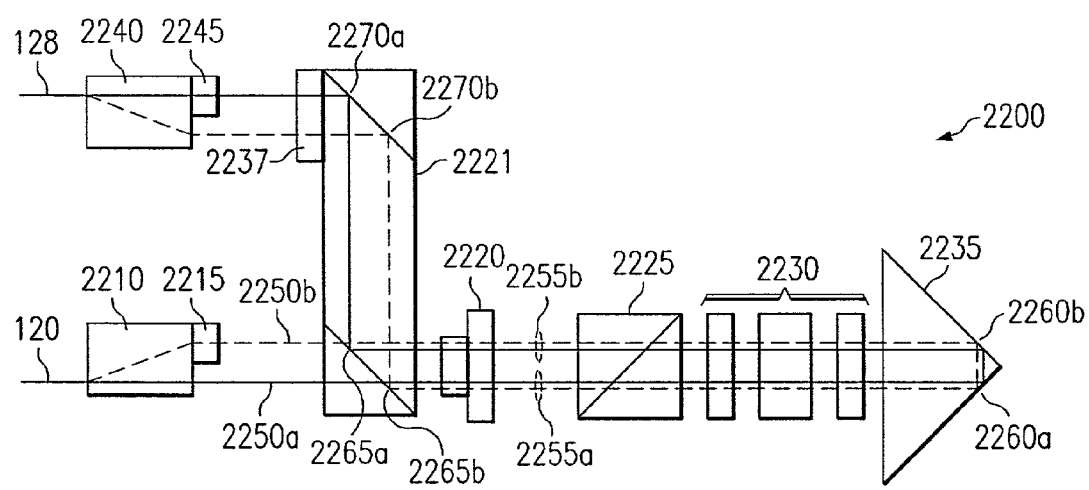
FIG. 17 is another block diagram describing an optical tilter.

Referring now to FIG. 17, there is illustrated a block diagram of an exemplary optical tilter 2200. Optical tilter 2200 includes a beam displacer 2210 with an attached halfwave plate 2215. A beam-displacing prism or rhomboid 2221 is disposed adjacent to the beam displacer 2210, followed by polarization rotator 2220, PBS 2225, crystal set 2230, and reflective element 2235. A halfwave plate 2237 is also attached to rhomboid 2221 at the point where the beams exit the rhomboid 2221 heading toward the second beam displacer 2240 which serves as a combining element for the two polarizations of the beam 2250. The second beam displacer 2240 has an attached halfwave plate 2245 through which beam 2250a travels as it enters the second beam displacer 2240.

In operation, the beam displacer 2210 receives amplified signal 120 and separates it into two orthogonally polarized beams: beam 2250a and beam 2250b. The halfwave plate 2215 rotates the polarization of beam 2250b by ninety degrees, thereby giving it the same polarization as beam 2250a, but traveling over a different path. Beams 2250a and 2250b are passed through rhomboid 2221. Beams 2250a and 2250b are propagated along spatial paths 2255a and 2255b, respectively, through a Faraday rotator 2220, PBS 2225, and crystal set 2230. The Faraday rotator 2220 is arranged such that it will not affect the polarization of beams 2250a–b while they are propagating toward reflective element 2235, but will rotate the polarization of beams 2250a–b on the return trip from the reflective element 2235.

Beams 2250a–b are then received by reflective element 2235. The polarized beam 2250a is received at a point 2260a while polarized beam 2250b is received at a point 2260b. The reflective element 2235 directs the polarized beam 2250a from point 2260a to point 2260b. At point 2260b, polarized beam 2250a is directed along path 2255b through crystal set 2230 and PBS 2225. The reflective element 2235 directs polarized beam 2250b from point 2260b to point 2260a. At point 2260a, polarized beam 2250b is directed along path 2255a through crystal set 2230 and PBS 2225. Beams 2250a–b are received at polarization rotator 2220. The polarization rotator 2220 rotates the polarization of each beam 2250a–b.

Polarized beams 2250a–b are then received at rhomboid 2221 at points 2265a and 2265b, respectively. Polarized beam 2250a is directed from point 2265a to point 2270a. At point 2270a, polarized beam 2250a is directed through halfwave plates 2237 and 2245. Each halfwave plate rotates the polarization of beam 2250a by ninety degrees, thereby resulting in no change in polarization. Polarized beam 2250b is directed from point 2265b to point 2270b. At point 2270b, polarized beam 2250b is directed through halfwave plate 2237 to beam displacer 2240. Halfwave plate 2237 rotates the polarization of beam 2250b by ninety degrees. Beam displacer 2240 combines polarized beams 2250a–b, thereby resulting in equalized signal 128.

The polarized beams 2250a–b are guided through the components, e.g., the crystal set 2230 and PBS 2225, along the same spatial paths 2255a–b, but in opposite directions. Although beams 2250a–b are depicted side-by-side for illustrative purposes, in practice, each beam 2250a–b is propagated along identical or coextensive spatial paths or along parallel, adjacent spatial paths, but in opposite directions. Guiding the polarized beams 2250a–b along coextensive or nearly coextensive spatial paths causes the polarized beams 2250a–b to traverse the same spatial locations, thereby minimizing the effect of the varying optical properties of the components. Also, by reflecting the beams back through the same components and essentially re-using those components, a second-order filter is built using fewer components than would otherwise be required.

Figure 18:
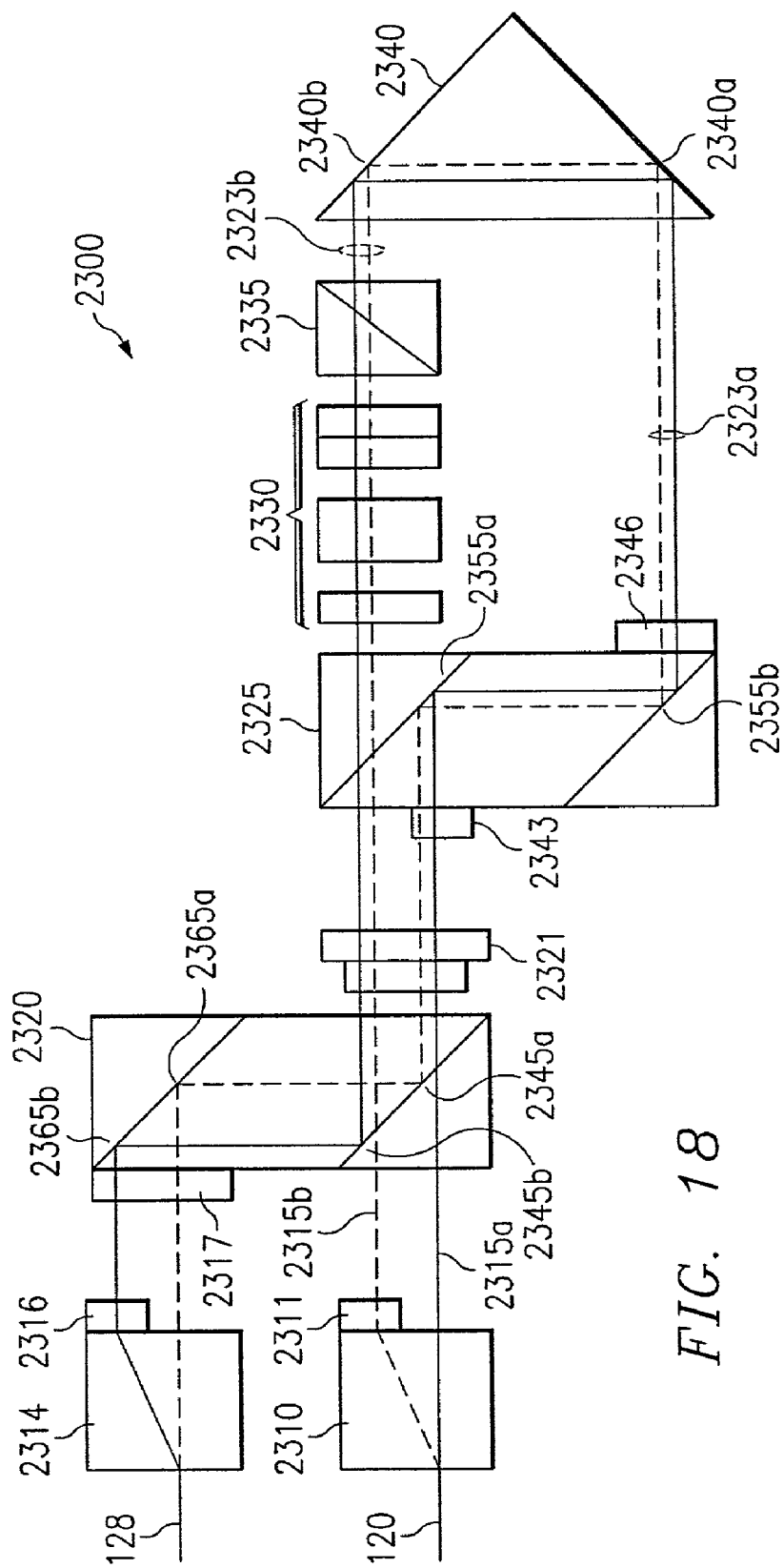
FIG. 18 is another block diagram describing an optical tilter.

Referring now to FIG. 18, there is illustrated a block diagram of an another embodiment of an optical tilter 2300. Optical tilter 2300 includes an input beam displacer 2310 and a halfwave plate 2311. Optical tilter 2300 further includes an output beam displacer 2314 and a halfwave plate 2316. A beam-displacing prism or rhomboid 2320 is positioned adjacent to both beam displacers 2310, 2314. A second beam-displacing prism or rhomboid 2325 is positioned adjacent to rhomboid 2320. A Faraday rotator 2321 is positioned between rhomboids 2320 and 2325.

The second rhomboid 2325 passes two signal paths on the side opposite from the polarization rotator 2321. Both of these paths terminate at a reflective element 2340, which as in prior embodiments serves to send a signal 2315a arriving on a first signal path segment 2323a back onto a second signal path segment 2323b and to reflect a signal 2315b arriving on the second path segment 2323b back onto the first signal path segment 2323a.

In this embodiment, there is a crystal set 2330 and a polarization beam splitter 2335 positioned along second path segment 2323b. Halfwave plates 2343 and 2346 are positioned on opposite sides of rhomboid 2325.

In operation, the amplified signal 120 is received at beam displacer 2310, which spatially separates beam 120 into two polarized beams 2315a and 2315b. The polarization of beam 2315b is rotated by ninety degrees by halfwave plate 2311. Beam 2315b propagates through rhomboid 2320, polarization rotator 2321, rhomboid 2325, crystal set 2330, and PBS 2335. Beam 2315a propagates through rhomboid 2320 and polarization rotator 2321. The polarization of beam 2315a is rotated by ninety degrees first by halfwave plate 2343 and then, after reflection at surfaces 2355a and 2355b of rhomboid 2325, again by halfwave plate 2346 such that the polarization of beam 2315a is the same as that of beam 2315b. From point 2355b, polarized beam 2315a propagates along path 2323a.

Beams 2315a–b are then received by reflective element 2340. The beam 2315a is received at a point 2340a while beam 2315b is received at a point 2340b. Element 2340 reflects the beam 2315b from point 2340b to point 2340a. At point 2340a, beam 2315b is reflected along path 2323a through halfwave plate 2346 and then to point 2355b. At point 2355b, polarized beam 2315b is reflected to point 2355a, and at point 2355a, beam 2315b is reflected through polarization rotator 2321 to rhomboid 2320 at point 2345b. Beam 2315b is rotated ninety degrees by polarization rotator 2321. The rhomboid 2320 reflects polarized beam 2315b from point 2345a to point 2365a. At point 2365a, polarized beam 2315b is reflected through halfwave plate 2317 to beam displacer 2314.

Element 2340 reflects beam 2315a from point 2340a to point 2340b. At point 2340b, beam 2315a is reflected along path 2323b through PBS 2335, crystal set 2330, rhomboid 2325 and polarization rotator 2321 to point 2345b. Beam 2315a is rotated ninety degrees by polarization rotator 2321. At point 2345b, beam 2315a is reflected to point 2365b. At point 2365b, beam 2315a is reflected through halfwave plates 2317 and 2316 and to beam displacer 2314. Beam displacer 2314 receives polarized beams 2315a–b and combines them into an equalized signal 128.

Although beams 2315a–b are depicted side-by-side for illustrative purposes, in practice, the beams 2315a–b are propagated along identical or nearly identical, spatial paths, but in opposite directions. Guiding the polarized beams 2315a–b along the same spatial path minimizes the effect of the varying optical properties of components, with respect to spatial location, and thereby improves the performance of the optical tilter 2300 and the quality of the equalized signal 128.

Figure 19:
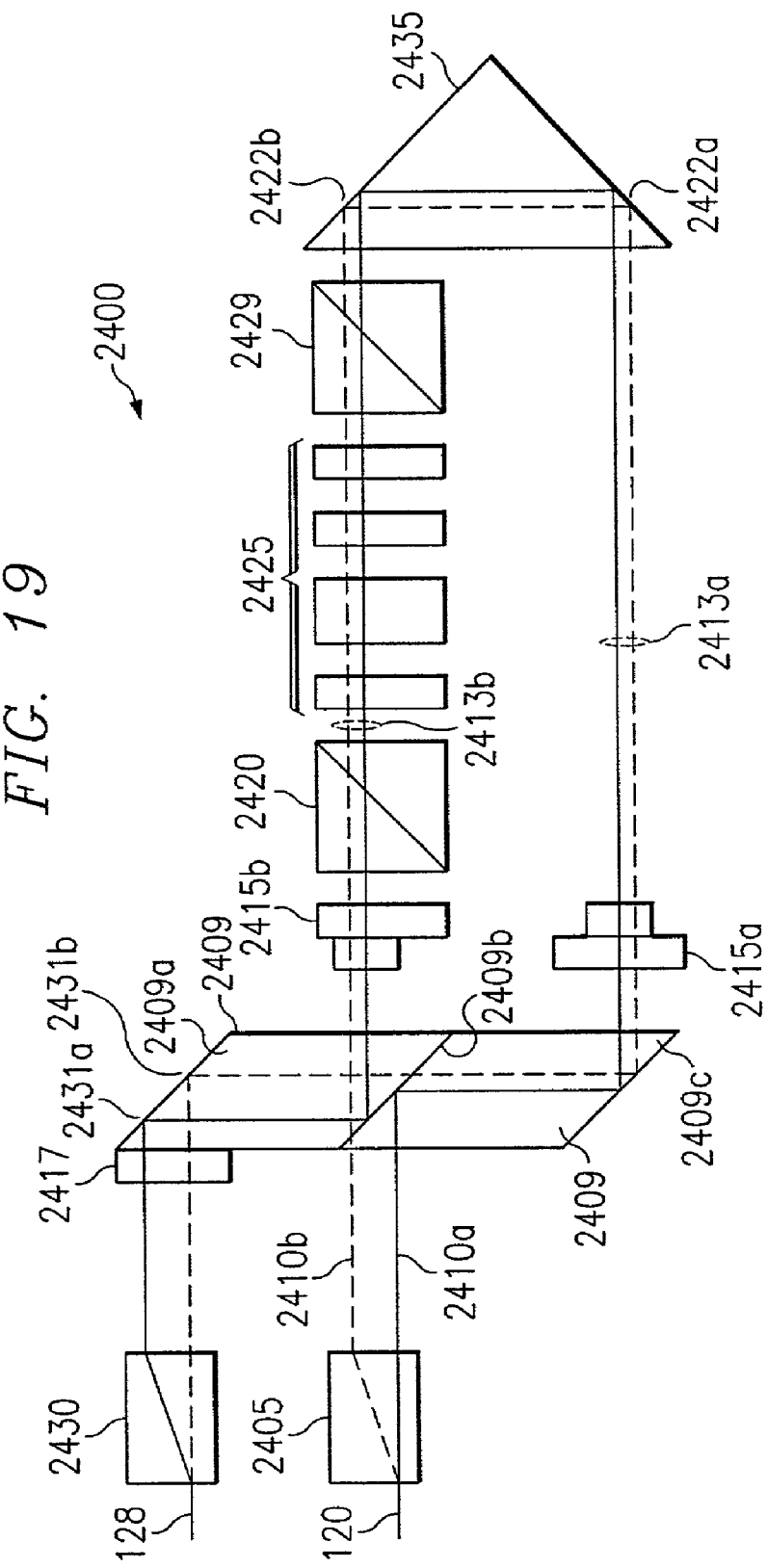
FIG. 19 is still another block diagram describing an optical tilter.

Referring now to FIG. 19, there is illustrated a block diagram of an exemplary optical tilter 2400 in accordance with a third embodiment. The optical tilter 2400 includes beam displacer 2405 and beam displacer 2430. A rhomboid prism 2409 is positioned adjacent to both beam displacer 2405 and beam displacer 2430. The rhomboid prism 2409 preferably includes a first reflective surface 2409a, a PBS surface 2409b, and a second reflective surface 2409c. Adjacent to the rhomboid prism 2409 is a polarization rotator 2415b, followed by PBS 2420, crystal set 2425, and PBS 2429. These elements are all placed along path segment 2413b. Adjacent to the rhomboid prism 2409 is polarization rotator 2415a. Polarization rotator 2415a is positioned along path segment 2413a. The path segments 2413a–b are both terminated at the reflective element 2435 at points 2422a–b, respectively.

In operation, the optical tilter 2400 receives amplified signal 120 at beam displacer 2405. Beam displacer 2405 spatially separates amplified signal 120, resulting in beams 2410a, and 2410b. Polarized beams 2410a and 2410b are guided to the PBS surface 2409b of redirecting element 2409. PBS surface 2409b reflects beam 2410a and passes beam 2410b. Beam 2410a is reflected from PBS 2409b and received by the second reflective surface 2409c, which reflects beam 2410a along path 2413a through polarization rotator 2415a to reflective element 2435. Beam 2410a is rotated twice, first by polarization rotator 2415a and then by 2415b. The net effect of these rotations is zero degrees, but the rotation allows the beam to be properly oriented for the polarization-based elements in those path segments.

Beam 2410b is guided along path 2413b through polarization rotator 2415b, PBS 2420, crystal set 2425, and PBS 2429 to reflective element 2435. Polarization rotator 2415b and 2415a do not affect the polarization of beam 2410b as it passes through them, because beam 2410b passes through these polarization rotators in the reverse direction. The crystal set 2425/PBS 2429 pair forms a harmonic filter 605 for beams 2410a–b.

The reflective element 2435 receives beam 2410a at point 2422a and beam 2410b at point 2422b. Beam 2410a is directed to point 2422b, while beam 2410b is directed to point 2422a. At point 2422b, reflective element 2435 directs polarized beam 2410a along spatial path 2413b through PBS 2429, crystal set 2425, PBS 2420 and polarization rotator 2415b to element 2409. Crystal set 2425 and PBS 2420 form a Fourier harmonic filter for beam 2410a.

At point 2422a, reflective element 2435 reflects polarized beam 2410b along spatial path 2413a through polarization rotator 2415a to second reflective surface 2409c. Surface 2409c reflects beam 2410b to PBS surface 2409b. The PBS surface 2409b directs beams 2410a and 2410b through first reflective surface 2409a, wherein beam 2410a is received at point 2431a and beam 2410b is received at point 2431b. First reflective surface 2409a reflects beams 2410a and 2410b through halfwave plate 2417 to beam displacer 2430. Beam displacer 2430 combines beam 2410a and beam 2410b, thereby resulting in equalized signal 128.

Guiding polarized beams 2410a–b to traverse the same spatial locations within the components, e.g., PBS 2420, crystal set 2425, and PBS 2429, causes the effects of the differing optical properties due to imperfections in the materials and fabrication to be minimized. Accordingly, the performance of the optical tilter 2400 and the quality of the equalized signal 128 are improved.

Although preferred embodiments are illustrated in the accompanying drawings and described in the foregoing detailed description, it should be understood that numerous other embodiments, rearrangements, modifications and substitutions are possible without departing from the spirit of the inventions as set forth and defined by the following claims. For example, the above preferred embodiments describe the controllable filtering of incoming optical signals in order to equalize those signals or otherwise impart certain output power spectrums from the described embodiment equalizers. It is also possible to amplify certain portions of the incoming signal to achieve a flat output power spectrum or more complexly shaped output power spectra. Thus, the component assembly could also include optical amplifier elements instead of or in addition to optical filters. The component assembly could in that instance impart a wavelength-dependent gain transfer function to the incoming signal, instead of a wavelength-dependent attenuation transfer function, or the component assembly could impart some mixture of the two. An optical "element" is a general term for an optical component or sub-component, and possible specific examples of such elements or components include crystals, liquid crystals, beam deflectors, polarizers, halfwave plates, PBSs, Faraday rotators, TIR elements, and birefringent elements. Filter stages may be comprised of crystal sets and/or crystal sets matched with one or more liquid crystals and/or polarizers. General terms such as "optical element" and other general terms set forth in the claims therefore should be given open meanings to accordingly cover specific embodiments falling within the general meaning of those general terms.

What is claimed is:

1. A method for controlling an optical harmonic equalizer comprising a plurality of harmonic filters the method comprising:
  receiving an input optical signal at an optical signal input of the optical harmonic equalizer;
  determining a target power spectrum for an output optical signal from the optical harmonic equalizer;
  measuring the power spectrum of the output optical signal;
  calculating the difference between the measured power spectrum and the target power spectrum; and adjusting at least one of an amplitude control voltage and a phase control voltage associated with at least one of the plurality of harmonic filters based on the difference between the measured power spectrum and the target power spectrum.

2. The method of claim 1, wherein the difference between the measured power spectrum and the target power spectrum is decomposed into a frequency-domain series approximation.

3. The method of claim 2 wherein the frequency-domain series approximation is a Fourier approximation.

4. The method of claim 2, wherein each series element in the frequency-domain series approximation is represented by a frequency-domain variable and at least one constant, and wherein each element in the approximation is associated with one of the plurality of harmonic filters.

5. The method of claim 4, wherein the constants associated with the elements in the frequency-domain series approximation are computed in steps, beginning with the lowest-order series element and ending with the highest-order series element.

6. The method of claim 5, wherein after each step prior to the last step, a residual function is calculated, wherein the residual function is the remainder after subtracting the then-current frequency-domain series approximation from the target power spectrum, wherein the then-current frequency-domain series approximation includes the computed frequency-domain series elements which are known at that step.

7. The method of claim 1 and further comprising performing the following actions after the measuring, calculating, and adjusting actions:
measuring again the power spectrum of the output optical signal;
calculating again the difference between the newly measured power spectrum and the target power spectrum; and
adjusting again at least one amplitude control voltage and at least one phase control voltage associated with at least one of the plurality of harmonic filters based on the difference between the newly measured power spectrum and the target power spectrum such that the approximation of the target power spectrum is made closer to the target power spectrum.

8. The method of claim 7, further comprising comparing the magnitude of the calculated difference to a predetermined threshold and repeating the measuring, calculating, and adjusting actions until the magnitude of the calculated difference is less than a predetermined threshold.

9. The method of claim 7, wherein the actions of measuring, calculating, and adjusting are repeated a particular number of times.

10. The method of claim 2 and further comprising determining the adjustments to be made to the at least one amplitude control voltage and the at least one phase control voltages based, at least in part, upon the frequency-domain elements of the frequency-domain series approximation of the difference between the measured power spectrum and the target power spectrum.

11. The method of claim 1, wherein the target power spectrum is substantially flat with respect to wavelength.

12. The method of claim 1, wherein the target power spectrum is not substantially flat with respect to wavelength and the optical harmonic equalizer is operable to pre-compensate for wavelength-dependent variation in the transfer function of at least one subsequent element in the optical path.

13. The method of claim 1 and further comprising computing initial values for the at least one amplitude control voltage and the at least one phase control voltage based, at least in part, upon the wavelength power spectrum of the input optical signal.

14. A method for controlling an equalizer having at least one harmonic filter, the method comprising:
determining a target transfer function for the equalizer;
measuring an actual transfer function for the equalizer;
calculating at least one of an amplitude constant and a phase constant for the at least one harmonic filter based, at least in part, upon the target transfer function and the actual transfer function; and
adjusting at least one of an amplitude control voltage and a phase control voltage applied to the at least one harmonic filter, wherein the adjustment to each of the at least one amplitude control voltage is dependent, at least in part, upon the at least one amplitude constant, and wherein the adjustment to each of the at least one phase control voltage is dependent, at least in part, upon the at least one phase constant.

15. The method of claim 14, wherein determining the target transfer function comprises:
measuring the power spectrum of the input optical signal; and
subtracting the power spectrum of the input optical signal from a target power spectrum.

16. The method of claim 15, and further comprising:
calculating the at least one amplitude constant and the at least one phase constant by decomposing the target transfer function into at least one Fourier component, wherein each of the at least one Fourier components is associated with a particular one of the at least one harmonic filters;
decomposing the actual transfer function into at least one Fourier component, wherein each of the at least one Fourier components is associated with a particular one of the at least one harmonic filters; and
comparing the at least one Fourier components of the actual transfer function to the at least one Fourier components of the target transfer function.

17. The method of claim 14 and further comprising repeating the measuring, calculating, and adjusting actions for a particular number of iterations.

18. A controller for controlling at least one of a plurality of harmonic filters of an optical equalizer, the controller comprising:
a processor for executing a plurality of executable instructions; and
a memory operable to store the plurality of executable instructions, wherein the executable instructions are operable to:
calculate at least one amplitude constant and at least one phase constant for each of the at least one harmonic filters; and
adjust at least one amplitude control voltage and at least one phase control voltage to the at least one harmonic filter, wherein each of the at least one amplitude control voltage is based, at least in part, upon the at least one amplitude constant, and wherein each of the at least one phase control voltage is based, at least in part, upon the at least one phase constant.

19. The controller of claim 18, wherein the executable instructions further comprise executable instructions which are operable to:
measure the power wavelength spectrum of an input signal; and subtract the power wavelength spectrum of the input signal from the target power wavelength spectrum to determine the target transfer function of the equalizer.

20. The controller of claim 18 wherein the controller is operable to communicate with an optical spectrum analyzer to measure an actual transfer function of the equalizer.

21. The controller of claim 20 wherein the actual transfer function is effectively measured by the optical spectrum analyzer by subtracting a power wavelength spectrum of the input optical signal from the power wavelength spectrum of an output optical signal.

22. The controller of claim 18 wherein the controller further comprises executable instructions for a graphical user interface used to configure the controller.

23. A method for controlling a plurality of harmonic filters, the method comprising:
    determining a target transfer function;
    calculating a first sinusoidal function with a first amplitude constant and a first phase constant, wherein the first sinusoidal function approximates the target transfer function;
    calculating a residual equalization profile by subtracting the first sinusoidal function from the target transfer function; and
    calculating a second sinusoidal function with a second amplitude constant and a second phase constant, wherein the second sinusoidal function approximates the residual equalization profile, and wherein the first and second sinusoidal functions added together more closely approximate the target transfer function than did the first sinusoidal function.

24. The method of claim 23, wherein determining the target transfer function further comprises:
    measuring the power wavelength spectrum of an input optical signal; and
    subtracting the power wavelength spectrum from a target output power wavelength spectrum.

25. The method of claim 23, wherein calculating the first sinusoidal function further comprises calculating a sinusoid with a predetermined wavelength with the lowest least square error with respect to the target transfer function.

26. The method of claim 23, further comprising:
    generating a first phase control voltage based on the first phase constant; and
    generating a first amplitude control voltage based on the first amplitude constant.

27. The method of claim 26 wherein the phase control voltage is applied to a first harmonic filter and wherein the first amplitude control voltage is also applied to the first harmonic filter, and wherein the first harmonic filter applies the first sinusoidal function to an input optical signal to generate an output optical signal.

28. The method of claim 27 and further comprising generating a second phase control voltage and a second amplitude control voltage to be applied to a second harmonic filter which will apply the second sinusoidal function to the input optical signal, wherein the first and second harmonic filters apply their respective sinusoidal functions to the input optical signal to generate the output optical signal.

29. The method of claim 27 and further comprising measuring an actual transfer function as the difference between the power wavelength spectra of the output optical signal and the input optical signal.

30. The method of claim 29 and further comprising comparing the actual transfer function to the target transfer function.

31. A controller for controlling a plurality of harmonic filters, the controller comprising:
    a processor which is operable to execute a plurality of executable instructions; and
    a memory in communication with the processor, the memory operable to store the plurality of executable instructions wherein the plurality of executable instructions are operable to:
    determine a target transfer function;
    calculate a first sinusoidal function with a first amplitude constant and a first phase constant, wherein the first sinusoidal function approximates the equalization profile;
    calculate a residual equalization function by subtracting the first sinusoidal function from the target transfer function; and
    calculate a second sinusoidal function with a second amplitude constant and a second phase constant, wherein the second sinusoidal function approximates the residual equalization function.

32. The controller of claim 31, wherein the plurality of executable instructions are further operable to:
    adjust a phase control voltage based on the first phase constant; and
    adjust an amplitude control voltage based on the first amplitude constant.

33. The controller of claim 32 wherein the phase control voltage is applied to a first harmonic filter and wherein the amplitude control voltage is also applied to the first harmonic filter, and wherein the first harmonic filter applies the first sinusoidal function to the input signal to generate an output optical signal.

34. The controller of claim 33 and further comprising calculating a second phase control voltage and a second amplitude control voltage to be applied to a second harmonic filter, wherein the first harmonic filter will apply the first sinusoidal function to the input optical signal and the second harmonic filter will apply the second sinusoidal function to the input optical signal to generate the output optical signal.

35. The controller of claim 34 wherein the memory and the processor are on separate integrated circuits.

36. The controller of claim 31, wherein the instructions which determine the target transfer function further comprise instructions which are operable to:
    measure the power spectrum of an input optical signal; and
    subtract the input power spectrum from a target power spectrum.

37. The controller of claim 31, wherein the instructions which calculate the first sinusoidal function further comprise instructions which calculate a sinusoid with a predetermined wavelength with the lowest least square error with respect to the target transfer function.

38. The controller of claim 31, wherein the instructions which calculate the residual function further comprise instructions which subtract the first sinusoidal function from the target transfer function.

* * * * *